US012311413B2

(12) United States Patent
Li et al.

(10) Patent No.: US 12,311,413 B2
(45) Date of Patent: May 27, 2025

(54) BASE STATION AND CLEANING ROBOT SYSTEM

(71) Applicant: BEIJING ROBOROCK TECHNOLOGY CO., LTD., Beijing (CN)

(72) Inventors: Xing Li, Beijing (CN); Chuanlin Duan, Beijing (CN); Pan Cheng, Beijing (CN)

(73) Assignee: BEIJING ROBOROCK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/413,847

(22) Filed: Jan. 16, 2024

(65) Prior Publication Data

US 2024/0149309 A1 May 9, 2024

Related U.S. Application Data

(63) Continuation of application No. PCT/CN2021/136173, filed on Dec. 7, 2021.

(30) Foreign Application Priority Data

Jul. 16, 2021 (CN) ......................... 202110805998.2

(51) Int. Cl.
*B08B 3/02* (2006.01)
*A47L 11/40* (2006.01)
(Continued)

(52) U.S. Cl.
CPC .......... *B08B 3/024* (2013.01); *A47L 11/4091* (2013.01); *B08B 1/165* (2024.01);
(Continued)

(58) Field of Classification Search
None
See application file for complete search history.

(56) References Cited

U.S. PATENT DOCUMENTS 10,786,129 B1 9/2020 Ebrahimi Afrouzi et al.
2005/0015656 A1 1/2005 Hetzler et al.
(Continued)

FOREIGN PATENT DOCUMENTS

CN 21583875 A1 9/2010
CN 215838750 U 9/2010
(Continued)

OTHER PUBLICATIONS

Translation of CN-112006618-A from espacenet (Year: 2020).*
(Continued)

*Primary Examiner* — Rita P Adhlakha
(74) *Attorney, Agent, or Firm* — Thomas | Horstemeyer, LLP

(57) ABSTRACT

The present disclosure relates to the field of smart home technologies, and proposes a base station and a cleaning robot system. The base station is configured to clean a cleaning system of a cleaning robot, and includes a base station body and a cleaning component. The base station body includes a cleaning groove, and the cleaning component is movably disposed on the base station body. The cleaning component includes a liquid outlet device, and cleaning liquid discharged by the liquid outlet device is configured to clean the cleaning system and enter the cleaning groove. After the cleaning component is positioned opposite to the cleaning system, the cleaning component moves, and the liquid outlet device moves along with the cleaning component. Then, the cleaning component can
(Continued)

remove debris from the cleaning system. That is, the cleaning robot can realize automatic cleaning on the cleaning component.

17 Claims, 21 Drawing Sheets

(51) Int. Cl.
*B08B 1/16* (2024.01)
*B08B 1/30* (2024.01)

(52) U.S. Cl.
CPC ........... *B08B 1/30* (2024.01); *A47L 2201/026* (2013.01); *A47L 2201/028* (2013.01); *B08B 2203/027* (2013.01)

(56) References Cited

U.S. PATENT DOCUMENTS

| | | | |
|---|---|---|---|
| 2005/0156562 | A1 | 7/2005 | Cohen et al. |
| 2009/0281661 | A1 | 11/2009 | Dooley et al. |
| 2014/0259511 | A1 | 9/2014 | Ziegler et al. |
| 2019/0059680 | A1 | 2/2019 | Fox et al. |
| 2020/0077858 | A1 | 3/2020 | Zhang et al. |
| 2020/0121153 | A1 | 4/2020 | Letsky |
| 2020/0329937 | A1 | 10/2020 | Sheikh et al. |
| 2021/0127923 | A1 | 5/2021 | Liang et al. |

FOREIGN PATENT DOCUMENTS

| | | | | | |
|---|---|---|---|---|---|
| CN | 104161486 | A | | 11/2014 | |
| CN | 206612752 | U | | 12/2016 | |
| CN | 106725135 | A | | 5/2017 | |
| CN | 108720744 | | | 11/2018 | |
| CN | 108720744 | A | | 11/2018 | |
| CN | 109528111 | A | | 12/2018 | |
| CN | 110464265 | A | | 12/2018 | |
| CN | 109316135 | | | 2/2019 | |
| CN | 109316135 | A | | 2/2019 | |
| CN | 110051287 | A | | 7/2019 | |
| CN | 110710931 | | | 1/2020 | |
| CN | 110710931 | A | | 1/2020 | |
| CN | 110710937 | A | | 1/2020 | |
| CN | 110786790 | A | | 2/2020 | |
| CN | 111134582 | | | 5/2020 | |
| CN | 111134582 | A | | 5/2020 | |
| CN | 210493961 | | | 5/2020 | |
| CN | 210493961 | U | | 5/2020 | |
| CN | 111436863 | A | | 7/2020 | |
| CN | 211381150 | | | 9/2020 | |
| CN | 211381150 | U | | 9/2020 | |
| CN | 111839367 | | | 10/2020 | |
| CN | 111839367 | A | | 10/2020 | |
| CN | 211749384 | U | | 10/2020 | |
| CN | 111973046 | A | | 11/2020 | |
| CN | 111973072 | | | 11/2020 | |
| CN | 111973072 | A | | 11/2020 | |
| CN | 112536266 | A | | 11/2020 | |
| CN | 211985278 | | | 11/2020 | |
| CN | 211985278 | U | | 11/2020 | |
| CN | 112006618 | | | 12/2020 | |
| CN | 112006618 | A | * | 12/2020 | |
| CN | 112168085 | | | 1/2021 | |
| CN | 112168085 | A | | 1/2021 | |
| CN | 112263191 | | | 1/2021 | |
| CN | 112263191 | A | | 1/2021 | |
| CN | 112515539 | A | | 3/2021 | |
| CN | 112515540 | A | | 3/2021 | |
| CN | 112515545 | | | 3/2021 | |
| CN | 112515545 | A | | 3/2021 | |
| CN | 112932346 | A | | 3/2021 | |
| CN | 112674658 | A | | 4/2021 | |
| CN | 112842178 | A | | 5/2021 | |
| CN | 213282758 | | | 5/2021 | |
| CN | 213282758 | U | | 5/2021 | |
| CN | 112869673 | | | 6/2021 | |
| CN | 112869673 | A | | 6/2021 | |
| CN | 112956965 | A | | 6/2021 | |
| CN | 112956976 | | | 6/2021 | |
| CN | 112956976 | A | | 6/2021 | |
| CN | 112971622 | A | | 6/2021 | |
| CN | 112971662 | | | 6/2021 | |
| CN | 112971662 | A | | 6/2021 | |
| CN | 113040664 | | | 6/2021 | |
| CN | 113040664 | A | | 6/2021 | |
| CN | 213551560 | U | | 6/2021 | |
| CN | 113057546 | A | | 7/2021 | |
| CN | 214048676 | U | | 8/2021 | |
| CN | 114587197 | A | | 6/2022 | |
| CN | 112497267 | B | * | 8/2024 | ............... B08B 1/00 |
| JP | H0662999 | A | | 3/1994 | |
| JP | 2018-086423 | A2 | | 6/2018 | |
| JP | 3240099 | U | | 12/2022 | |
| KR | 19980000345 | A | | 3/1998 | |
| RU | 2540058 | C2 | | 1/2015 | |
| TW | 201709864 | | | 3/2017 | |
| TW | 201709864 | A | | 3/2017 | |
| WO | 9801892 | | | 1/1998 | |
| WO | 9801892 | A1 | | 1/1998 | |
| WO | WO2006089307 | A2 | | 8/2006 | |

OTHER PUBLICATIONS

CN 112497267 translation, filed Nov. 9, 2020, published Aug. 16, 2024 (Year: 2020).*
International Search Report dated Apr. 13, 2022 in co-pending PCT Patent Application No. PCT/CN2021/136173.
CN202111014045.0—1st Office Action.
CN202111014045.0—Notice of Allowance with English.
PCTCN2022105562 International Search Report.
Office Action in CN2021108059361 dated Sep. 28, 2022.
Office Action in CN2021108059982 dated Sep. 29, 2022.
International Search Report in PCT/CN2021/137566 dated Jan. 19, 2023.
Office Action in TW111126731 dated Aug. 10, 2023.
International Search Report in PCT/2021/124223 mailed Jan. 19, 2023.
International Search Report in PCT/CN2022/082061 mailed Jan. 19, 2023.
RU2024103281—1st Office Action with English Translation.
AU2021456309—1st Office Action.
JP2024-513411—1st Office Action.

* cited by examiner

BASE STATION AND CLEANING ROBOT SYSTEM

CROSS REFERENCE TO RELATED APPLICATION(S)

The present application is a Continuation Application of PCT International Application No. PCT/CN2021/136173 filed on Dec. 7, 2021, which claims the priority to Chinese Patent Application No. 202110805998.2 field on Jul. 16, 2021, the entire contents of both are incorporated herein by reference for all purposes.

TECHNICAL FIELD

The present disclosure relates to the field of smart home technologies, and in particular to a base station and a cleaning robot system.

BACKGROUND

For a conventional cleaning robot, a cleaning part of the cleaning robot typically requires to be cleaned after the cleaning robot performs a wet cleaning task. At present, the wet cleaning part is mostly manually cleaned or replaced with a new one, which is inconvenient to use.

SUMMARY

According to an aspect of the present disclosure, there is provided a base station for cleaning a cleaning system of a cleaning robot, including:

- a base station body, including a cleaning groove;
- a cleaning component, movably disposed on the base station body, and including a liquid outlet device, wherein cleaning liquid discharged by the liquid outlet device is configured to clean the cleaning system and enter the cleaning groove.

According an aspect of the present disclosure, there is provided a cleaning robot system, including the above-mentioned base station and a cleaning robot.

According to an aspect of the present disclosure, there is provided a base station for cleaning a cleaning system of a cleaning robot, including:

- a base station body;
- a cleaning component, movably disposed on the base station body, and including a first cleaning part and a second cleaning part different from the first cleaning part;
- wherein, the first cleaning part and the second cleaning part remove debris from the cleaning system by interacting with the cleaning system.

According to an aspect of the present disclosure, there is provided a cleaning robot system, including the above-mentioned base station and a cleaning robot.

According to an aspect of the present disclosure, there is provided a base station for cleaning a cleaning system of a cleaning robot, including:

- a base station body, including a cleaning groove;
- a cleaning component, disposed on the base station body approximately horizontally, and including a liquid outlet device and a cleaning part;
- wherein, cleaning liquid discharged by the liquid outlet device is configured to clean the cleaning system by the cleaning part and enter the cleaning groove.

According to an aspect of the present disclosure, there is provided a cleaning robot system, including the above-mentioned base station and a cleaning robot.

BRIEF DESCRIPTION OF THE DRAWINGS

By considering the following detailed description of optional embodiments of the present disclosure in conjunction with the accompanying drawings, various objectives, features, and advantages of the present disclosure will become more apparent. The drawings are merely exemplary illustrations of the present disclosure, and are not necessarily drawn to scale. In the drawings, the same reference numerals always refer to the same or similar elements.

Figure 1:
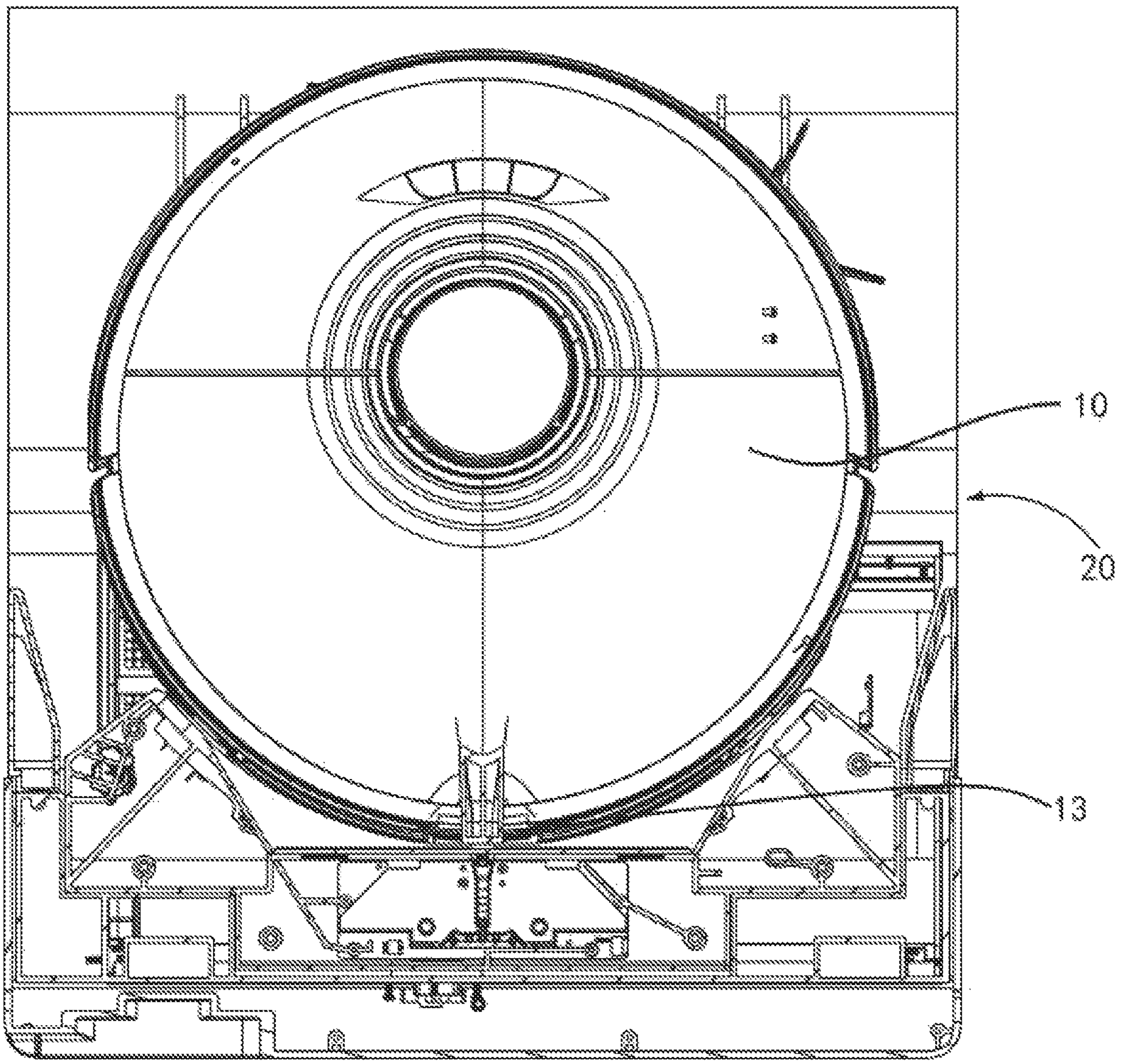
FIG. 1 is a schematic structural diagram illustrating a cleaning robot of a cleaning robot system in a first posture according to an exemplary embodiment.

The reference numbers are explained as follows:

10, cleaning robot; 110, robot body; 111, forward portion; 112, rearward portion; 120, sensing system; 121, position determining device; 122, bumper; 1221, through hole; 130, control module; 140, driving system; 141, driving wheel module; 142, driven wheel; 150, cleaning system; 151, dry cleaning system; 152, side brush; 160, power system; 170, human-computer interaction system; 400, wet cleaning system; 410, cleaning head; 420, driving unit; 421, driving plate; 422, supporting plate; 4217, liquid outlet device; 4218, pump pipe; 4219, pump; 12, first charging contactor; 13, liquid container; 14, second fixture part; 16, liquid filling port; 17, valve; 18, pipeline; 19, rotating wheel;

20, base station body; 21, cleaning groove; 211, liquid pumping port; 22, guide plate; 221, slip-resistance protrusion; 222, extension plate; 23, guide side surface; 231, side surface; 232, middle surface; 24, guide ceiling; 25, guide block; 26, guide wheel; 27, guide bridge;

30, cleaning component; 31, first cleaning part; 311, first rotating shaft; 32, second cleaning part; 33, cleaning component holder; 34, driving part; 341, gear; 342, rack; 343, second rotating shaft; 35, liquid outlet; 36, liquid outlet device; 371, first gear; 372, second gear; 373, third gear; 374, fourth gear; 375, fifth gear; 376, sixth gear; 377, seventh gear; 378, eighth gear; 379, ninth gear; 40, second charging contactor; 50, liquid filling connector; 51, main body part; 52, sealing part; 53, joint part; 60, first fixture part; 61, accommodation part; 70, liquid supply part; 71, collection container.

DETAILED DESCRIPTION

Embodiments embodying features of the present disclosure will be described in detail in the following description. It should be understood that the present disclosure can have various changes in different embodiments, which do not depart from the scope of the present disclosure. The description and drawings therein are essentially for illustrative purposes, rather than limiting the present disclosure.

In the following description of different exemplary embodiments of the present disclosure, reference is made to the accompanying drawings, which form a part of the present disclosure, and show by way of example different exemplary structures, systems, and steps that can implement various aspects of the present disclosure therein. It should be understood that other specific solutions of components, structures, exemplary devices, systems, and steps can be used, and structural and functional modifications can be made without departing from the scope of the present disclosure. Moreover, although the terms “above”, “between”, “within”, etc. may be used in this specification to describe different exemplary features and elements of the present disclosure, these terms are used herein for convenience only. For example, the description may be based on an example direction in the drawings. Nothing in this specification should be understood as requiring a specific three-dimensional direction of the structure to fall within the scope of the present disclosure.

As illustrated in FIGS. 1 to 23, a cleaning robot system of embodiments of the present disclosure may include a cleaning robot 10 and a base station.

Figure 3:
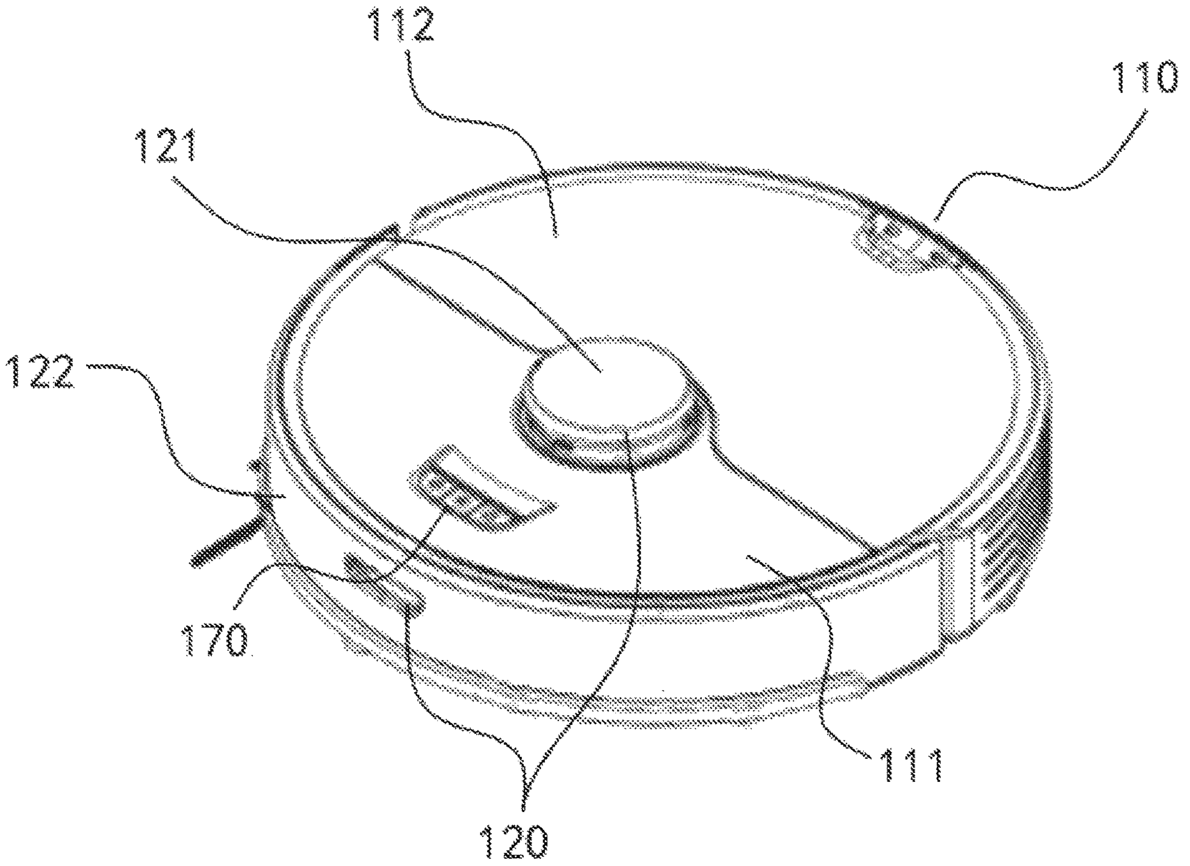
FIG. 3 is a schematic structural diagram illustrating a cleaning robot from a first perspective of view according to an exemplary embodiment.
Figure 4:
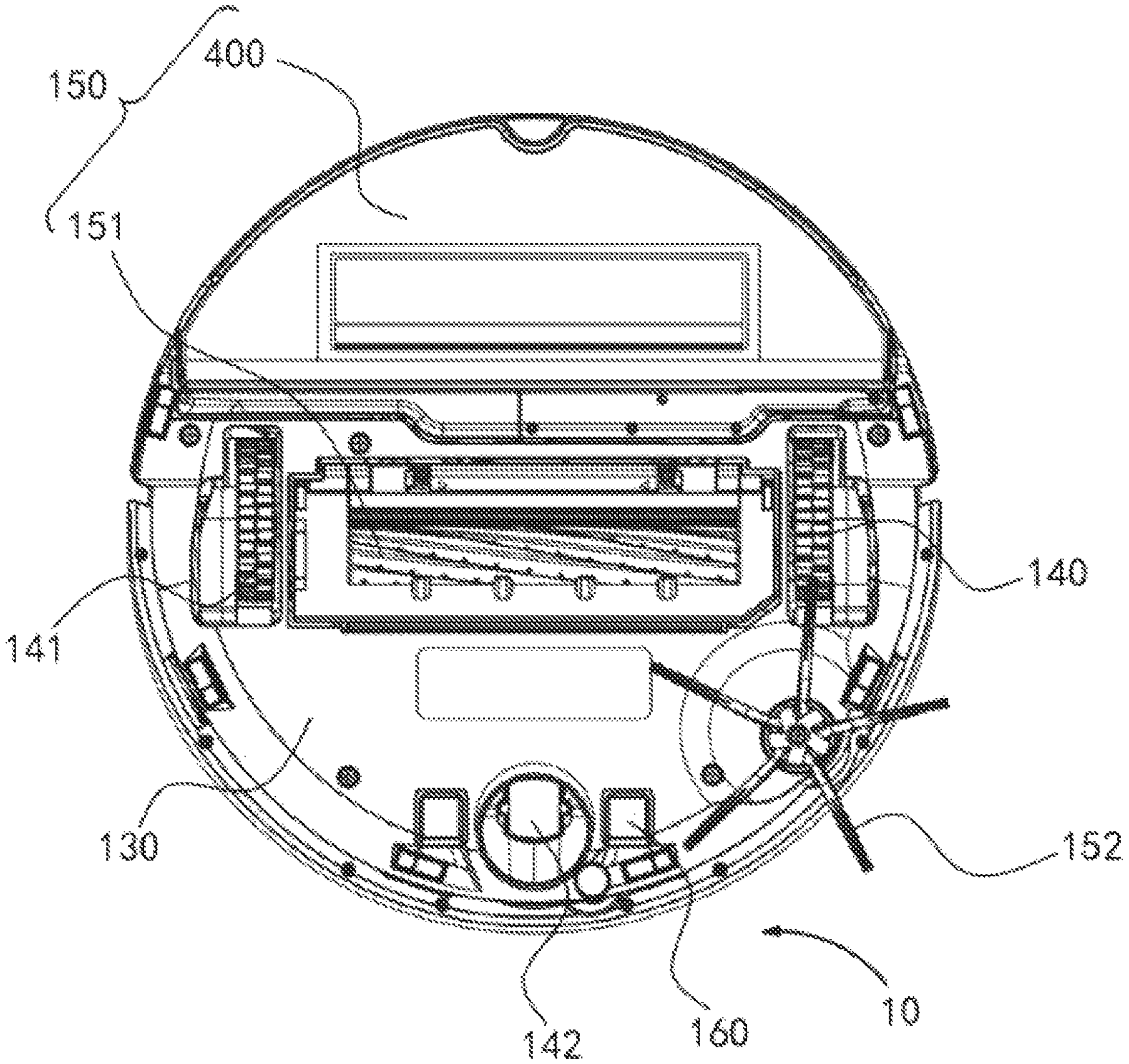
FIG. 4 is a schematic structural diagram illustrating a cleaning robot from a second perspective of view according to an exemplary embodiment.

In an embodiment of the present disclosure, as shown in FIGS. 3 and 4, a cleaning robot 10 may include a robot body 110, a sensing system 120, a control module 130, a driving system 140, a cleaning system 150, a power system 160, and a human-computer interaction system 170.

As shown in FIG. 3, the robot body 110 may include a forward portion 111 and a rearward portion 112, which have approximate circular shapes (i.e., the forward portion and the rearward portion are both circular). The robot body 110 may also have other shapes, including but not limited to an approximate D-shape with a rectangular forward portion and a circular rearward portion, and a shape with the forward portion and the rearward portion being rectangular or square.

As shown in FIG. 3, the sensing system 120 may include a position determining device 121 located on the robot body 110, a collision sensor and a proximity sensor disposed on a bumper 122 of the forward portion 111 of the robot body 110, a cliff sensor disposed on a lower part of the robot body, and a sensing device such as a magnetometer, an accelerometer, a gyroscope, an odometer disposed inside the robot body, for providing the control module 130 with various position information and motion state information of the robot. The position determining device 121 includes, but is not limited to, a camera and a laser distance sensor (LDS).

As shown in FIG. 3, the forward portion 111 of the robot body 110 may carry the bumper 122. In a case that a driving wheel module 141 pushes the cleaning robot 10 to walk on the ground during a cleaning process, the bumper 122 detects one or more events along a travel path of the cleaning robot 10 through a sensor system disposed thereon, such as an infrared sensor. The cleaning robot 10 may control the driving wheel module 141, based on the events detected by the bumper 122, such as obstacles and walls, such that the cleaning robot 10 responds to the events, such as moving away from the obstacles.

The control module 130 is disposed on a main circuit board in the robot body 110, and may include a computing processor, such as a central processing unit, an application processor, for communicating with a non-transitory memory, such as a hard disk, a flash memory, a random access memory. The application processor uses a positioning algorithm such as simultaneous localization and mapping (SLAM) to create a simultaneous map of the environment where the cleaning robot 10 is located, according to obstacle information fed back by the laser distance sensor. In addition, in combination with distance information and speed information fed back by the sensing device such as the sensor, the cliff sensor, the magnetometer, the accelerometer, the gyroscopes, the odometer disposed on the bumper 122, it is determined comprehensively which operating state the cleaning robot 10 is currently in, which position the cleaning robot 10 is currently located at, and the current posture of the cleaning robot 10, such as crossing a threshold, moving onto the carpet, being on a cliff, getting stuck on top or bottom, with a full dust container, being picked up, etc. The next action strategy may be provided for different situations, so that the cleaning robot 10 has better cleaning performance and user experience.

As shown in FIG. 4, the driving system 140 may manipulate the robot body 110 to travel across the ground based on a driving command having distance and angle information (for example, x, y, and θ components). The driving system 140 includes a driving wheel module 141 that can control the left wheel and the right wheel at the same time. In order to more accurately control the motion of the robot, the driving wheel module 141 may include a left driving wheel module and a right driving wheel module. The left and right driving wheel modules are disposed along a transverse axis defined by the robot body 110. In order for the cleaning robot 10 to move more stably on the ground or have stronger motion ability, the cleaning robot 10 may include one or more driven wheels 142, which include, but are not limited to, universal wheels. The driving wheel module includes a walking wheel, a driving motor, and a control circuit for controlling the driving motor. The driving wheel module may be also connected to a circuit for measuring the driving current and the odometer. The driving wheel module 141 may be detachably connected to the robot body 110, which is convenient for disassembly, assembly and maintenance. The driving wheel may have a biased drop type of suspension system, which is fastened in a movable way, for example, attached in a rotatable way, to the robot body 110, and receives a spring bias that is biased downward and away from the robot body 110. The spring bias allows the driving wheel to maintain contact and traction with the ground by a certain ground force, and at the same time, the cleaning part of the cleaning robot 10 also contacts the ground by a certain pressure.

The power system may include a rechargeable battery, such as a nickel-metal hydride battery and a lithium battery. The rechargeable battery may be connected with a charging control circuit, a battery pack charging temperature detection circuit, and a battery undervoltage monitoring circuit. The charging control circuit, the battery pack charging temperature detection circuit, and the battery undervoltage monitoring circuit are then connected with the single-chip control circuit. The robot is connected to a charging station through a charging electrode disposed on a side or below the robot for charging.

The human-computer interaction system 170 may include a button on a host panel for a user to select functions. It may also include a display screen and/or an indicator light and/or a speaker, wherein the display screen, the indicator light and the speaker show the user the current state of the robot or the function selection options. It may also include a mobile client application. For a path-navigation type of cleaning robot, the mobile client can show the user the map of the environment where the robot is located, and the location of the robot, which may provide the user with richer and more user-friendly functional items.

The cleaning system may be a dry cleaning system 151 and/or a wet cleaning system 400.

As shown in FIG. 4, the dry cleaning system 151 according to an embodiment of the present disclosure may include a rolling brush, a dust container, a fan, and an air outlet. The rolling brush that has a certain interaction with the ground sweeps the garbage on the ground and rolls it to the front of a dust suction port between the rolling brush and the dust container. Then the garbage is sucked into the dust container by the suction gas generated by the fan and passing through the dust container. The dust removal capacity of the cleaning robot 10 can be characterized by dust pickup efficiency (DPU). The dust pickup efficiency DPU is affected by the structure and material of the rolling brush, and is affected by the dust suction port, the dust container, the fan, the air outlet, and air utilization of the air duct formed by connecting parts between these four components. Further, the dust pickup efficiency DPU is affected by the type and power of the fan. This is a complicated system scheme problem. Compared with an ordinary plug-in vacuum cleaner, the improvement of dust removal capacity is of greater significance to the cleaning robot with limited power. The improvement of dust removal capacity directly and effectively reduces the power requirements. That is to say, an original robot that may clean 80 square meters of ground with a single charge may evolve into a single charge to clean 180 square meters or more. In addition, the service life of the battery that reduces recharge cycles may also be greatly increased, so that the replacement frequency of the battery by the user may also decrease. More intuitively and more importantly, the improvement of dust removal capability is the most obvious and important user experience, and the user will directly draw a conclusion about whether the sweep is clean or the mopping is clean. The dry cleaning module may also include a side brush 152 having a rotating shaft, wherein the rotating shaft is at a certain angle with respect to the ground, for moving scrap to a rolling brush area of the cleaning system 150.

As shown in FIGS. 4 to 8, the wet cleaning system 400 according to an embodiment of the present disclosure may include: a cleaning head 410, a driving unit 420, a liquid delivery mechanism, a liquid container 13, and the like. The cleaning head 410 may be disposed below the liquid container 13, and the cleaning liquid inside the liquid container 13 is delivered to the cleaning head 410 through the liquid delivery mechanism, so that the cleaning head 410 performs wet cleaning on a surface to be cleaned. In other embodiments of the present disclosure, the cleaning liquid inside the liquid container 13 may also be sprayed directly onto the surface to be cleaned, and the cleaning head 410 performs cleaning on the surface by evenly spreading the cleaning liquid.

The cleaning head 410 is configured to clean the surface to be cleaned, and the driving unit 420 is configured to drive the cleaning head 410 to substantially reciprocate along the target surface, which is a part of the surface to be cleaned. The cleaning head 410 reciprocates along the surface to be cleaned, and a side of the contact surface between the cleaning head 410 and the surface to be cleaned is provided with a cleaning cloth or a cleaning plate, which leads to high-frequency friction with respect to the surface to be cleaned due to the reciprocating motion, thereby removing stains from the surface to be cleaned.

The higher the friction frequency, the more friction times per unit time. The high-frequency reciprocating motion, also called reciprocating vibration, has a greater cleaning capacity than the ordinary reciprocating motion, such as rotation. The friction cleaning, of which the friction frequency is optionally close to the sound wave, have a better cleaning effect than the rotating friction cleaning with dozens of turns per minute. On the other hand, hair tufts on the surface of the cleaning head 410 may be more uniform and stretched in the same direction under the shaking of high-frequency vibration. Thus, the overall cleaning effect is more uniform, which is reflected in the effect that water marks on the surface to be cleaned after high-frequency vibration cleaning are more uniform, and no messy water mark is left. Instead, if the down pressure is applied to increase the friction force for improving the cleaning effect with low frequency rotation, the down pressure does not cause the hair tufts to extend in the same direction.

The reciprocating motion may be repeated motion along any one or more directions within the surface to be cleaned. Alternatively, it may be vibrations perpendicular to the surface to be cleaned, which is not strictly limited. Optionally, the direction of the reciprocating motion of the cleaning module is approximately perpendicular to the travel direction of the robot, because the direction of the reciprocating motion parallel to the travel direction of the robot would cause instability to the robot itself, due to the thrust and resistance in the travel direction leading to the driving wheels easy to slip. The impact of slipping is more obvious in a case that the wet cleaning module is included, because the wet surface to be cleaned increases the possibility of slipping. In addition to affecting the smooth moving and cleaning effect of the robot, the slipping may also cause the sensor such as the odometer, the gyroscope to be inaccurate in range measurement. This results in the navigation-type of cleaning robot being unable to accurately locate and create the map. In the case of frequent slipping, the impact on SLAM may not be ignored. Therefore, it is necessary to avoid the robot from slipping as much as possible. In addition to slipping, the motion component of the cleaning head 410 in the travel direction of the robot causes the robot to be continuously pushed forwards and rearwards when traveling, which will lead the traveling of the robot to be unstable and unsmooth.

Figure 5:
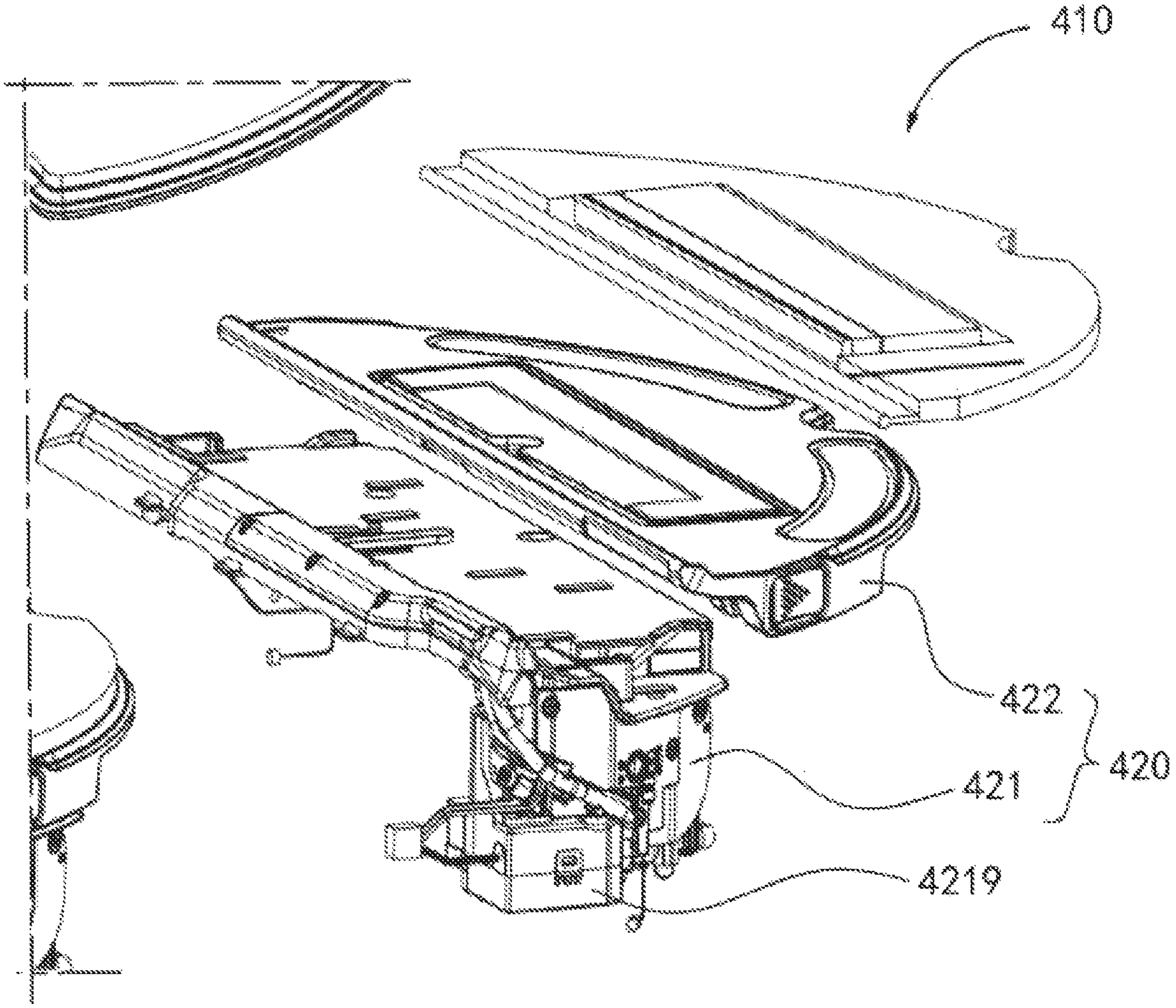
FIG. 5 is a partial exploded structural diagram illustrating a cleaning robot according to an exemplary embodiment.
Figure 6:
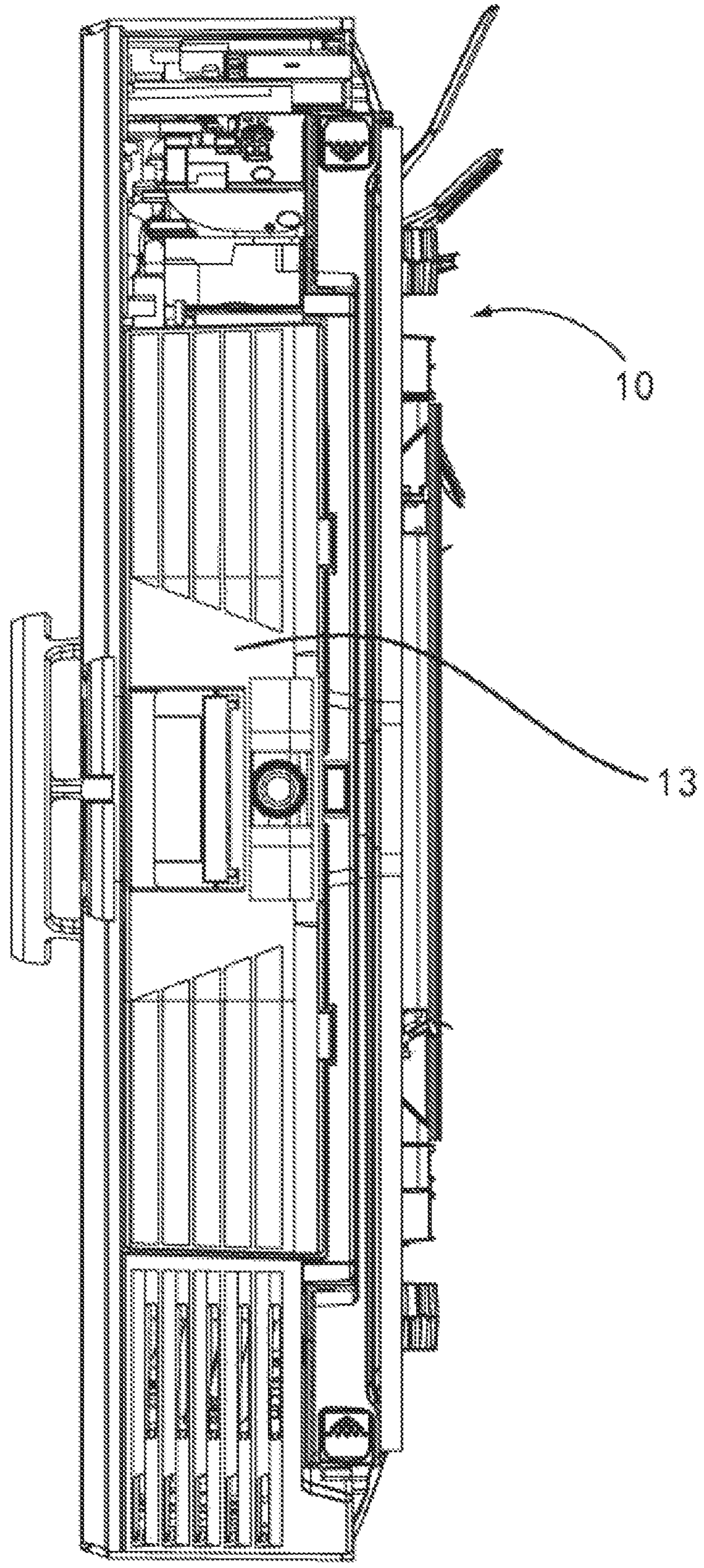
FIG. 6 is a schematic structural diagram illustrating a cleaning robot from a third perspective of view according to an exemplary embodiment.

In an embodiment of the present disclosure, as shown in FIG. 5, the driving unit 420 may further include: a driving plate 421 connected to a bottom surface of the robot body 110 and configured to provide a driving force; and a supporting plate 422 detachably connected to the driving plate 421 and configured to support the cleaning head 410, wherein the supporting plate 422 may be raised and lowered under the driving of the driving plate 421.

In an optional embodiment of the present disclosure, the wet cleaning system 400 may be connected to the robot body 110 through an active lifting module. In a case that the wet cleaning system 400 is temporarily not in operation, for example, the cleaning robot 10 stops at the base station to clean the cleaning head 410 of the wet cleaning system 400 and injects liquid into the liquid container 13. Alternatively, in a case that the surface to be cleaned cannot be cleaned by the wet cleaning system 400, the wet cleaning system 400 is lifted by the active lifting module.

In the wet cleaning system 400 according to an embodiment of the present disclosure, the cleaning head 410, the driving plate 421, the supporting plate 422, the liquid delivery mechanism, and the liquid container 13 may be powered by one motor or multiple motors. The power system 160 provides power for the motor, and the control module 130 provides the overall control.

Figure 10:
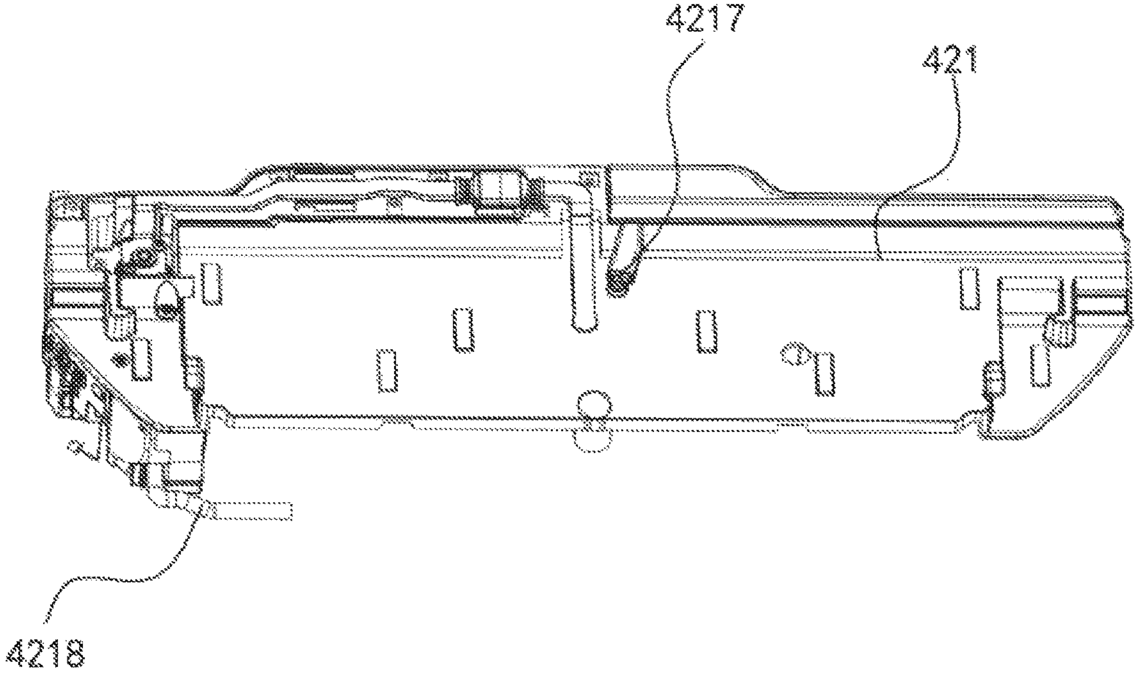
FIG. 10 is a schematic structural diagram illustrating a supporting plate of a cleaning robot according to an exemplary embodiment.

The liquid delivery mechanism in an embodiment of the present disclosure may include a liquid outlet device, which may be directly or indirectly connected to the liquid outlet of the liquid container 13. As shown in FIG. 10, the cleaning liquid may flow to the liquid outlet device 4217 through the cleaning liquid outlet of the liquid container 13, and may be evenly sprayed on the surface to be cleaned by the liquid outlet device. The liquid outlet device may be provided with a connecting part, and the liquid outlet device is connected with the cleaning liquid outlet of the liquid container 13 through the connecting part. The liquid outlet device is provided with a distribution opening, which may be a continuous opening or a combination of several discontinuous small openings. Several nozzles may be disposed at the distribution opening. The cleaning liquid flows to the distribution opening through the cleaning liquid outlet of the liquid container 13 and the connecting part of the liquid outlet device, and is evenly sprayed on the surface to be cleaned through the distribution opening.

As shown in FIGS. 5 and 10, the liquid delivery mechanism may further include a pump 4219 and/or a pump pipe 4218. The pump 4219 may directly communicate with the cleaning liquid outlet of the liquid container 13 or communicate with it through the pump pipe 4218.

The pump 4219 may be connected to the connecting part of the liquid outlet device, and may be configured to pump the cleaning liquid from the liquid container 13 to the liquid outlet device. The pump can be a gear pump, a vane pump, a plunger pump, a peristaltic pump, and so on.

The liquid delivery mechanism pumps out the cleaning liquid in the liquid container 13 through the pump 4219 and the pump pipe 4218, and then transports it to the liquid outlet device. The liquid outlet device 4217 may be a nozzle, drip hole, soaking cloth, etc., and evenly spread the liquid on the cleaning head 410, so as to wet the cleaning head 410 and the surface to be cleaned. The stains on the wet surface to be cleaned may be cleaned more easily. In the wet cleaning system 400, the power/flow rate of the pump may be adjusted.

Figure 7:
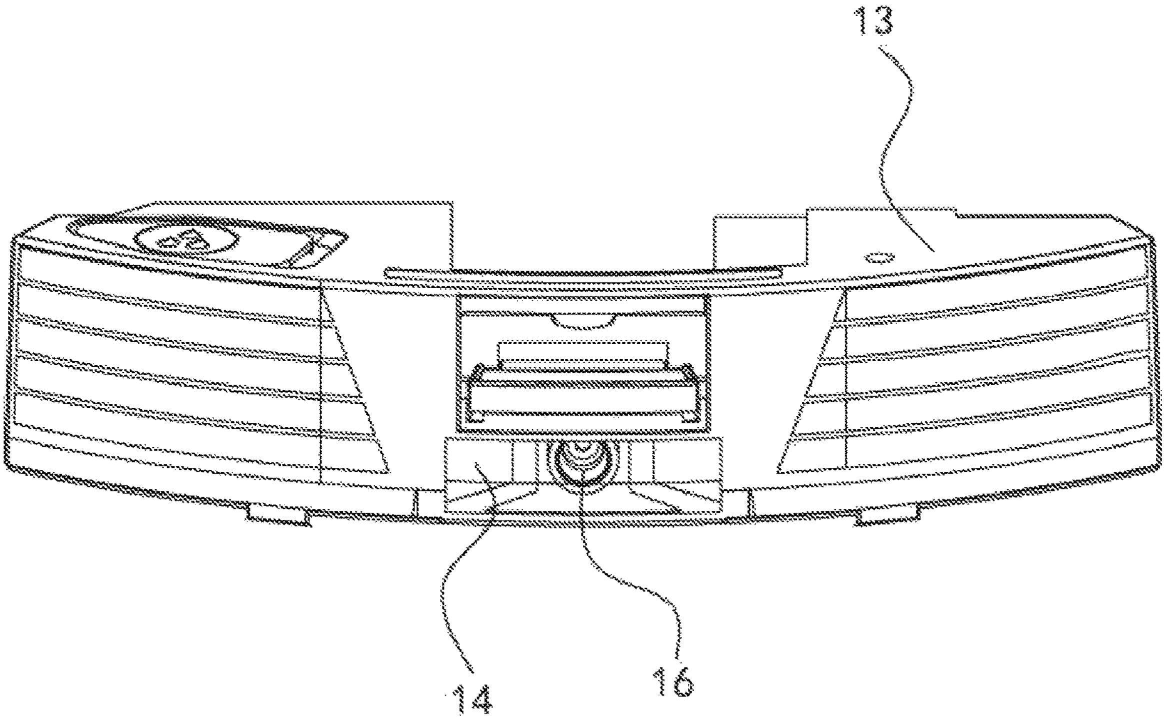
FIG. 7 is a schematic structural diagram illustrating a liquid container of a cleaning robot according to an exemplary embodiment.
Figure 8:
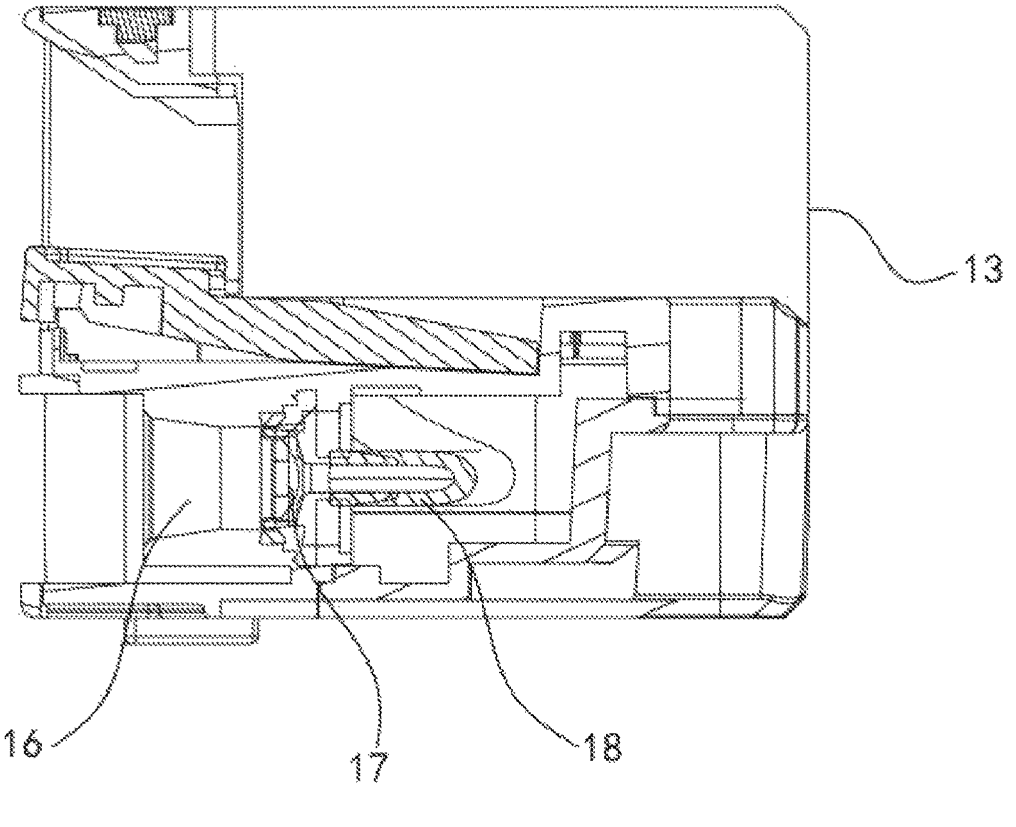
FIG. 8 is a schematic cross-sectional structural diagram illustrating a liquid container of a cleaning robot according to an exemplary embodiment.
Figure 9:
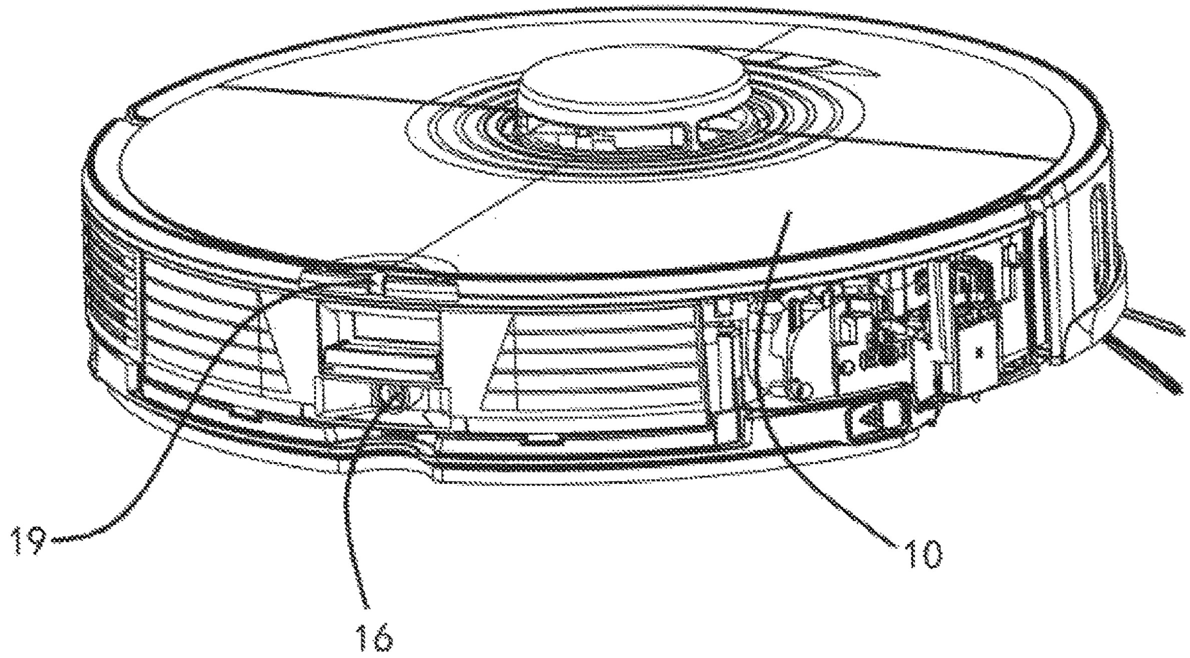
FIG. 9 is a schematic structural diagram illustrating a cleaning robot from a fourth perspective of view according to an exemplary embodiment.

In an embodiment of the present disclosure, the liquid container 13 may further include a liquid filling port 16. As shown in FIGS. 7 to 9, the liquid filling port 16 may be located on a side wall of the liquid container 13. In a case that the cleaning robot 10 stops at the base station, the base station can fill the liquid container 13 of the cleaning robot 10 with liquid through the liquid filling port 16.

In an embodiment of the present disclosure, as shown in FIG. 7, a second fixture part 14 may be disposed on the liquid container 13, and is configured to connect with the base station, so that the base station can fill the liquid container 13 of the cleaning robot 10 with liquid through the liquid filling port 16.

In an embodiment of the present disclosure, as shown in FIG. 8, the liquid filling port 16 of the liquid container 13 may be provided with a valve 17, which may be opened and closed to control the communication and disconnection between the liquid filling port 16 and the liquid container 13. A pipeline 18 is disposed in the liquid container 13, and one end of the pipeline 18 is provided with the valve 17.

In an embodiment of the present disclosure, the valve 17 may be an electronic valve or a manual valve, and it is ensured that the valve 17 may be open or closed under the respective control. In other embodiments of the present disclosure, the valve 17 may also be a check valve. In a case that the liquid container 13 is refilled and the connection between the liquid filling port 16 and the liquid container 13 is disconnected, the valve 17 is automatically closed to prevent the cleaning fluid in the liquid container 13 from flowing out. For example, the valve 17 may be a cross valve, a lift check valve, a swing check valve, or the like.

In an embodiment of the present disclosure, the cleaning robot 10 further includes a first charging contactor 12, which may be disposed on the robot body 110 and connected to the power system of the cleaning robot 10. In a case that the cleaning robot 10 stays at the base station, the base station may charge the power system of the cleaning robot 10 through the first charging contactor 12. In an embodiment of the present disclosure, the first charging contactor 12 may be located on a side of the robot body of the cleaning robot 10. This arrangement can prevent the stagnant liquid on the ground from polluting the first charging contactor 12, and also prevent damage to the cleaning robot 10 in a case that the charging contactor contacts the liquid if the robot 10 stays at the base station to fill the liquid container 13 with liquid or clean the cleaning system 150 of the cleaning robot 10.

Figure 11:
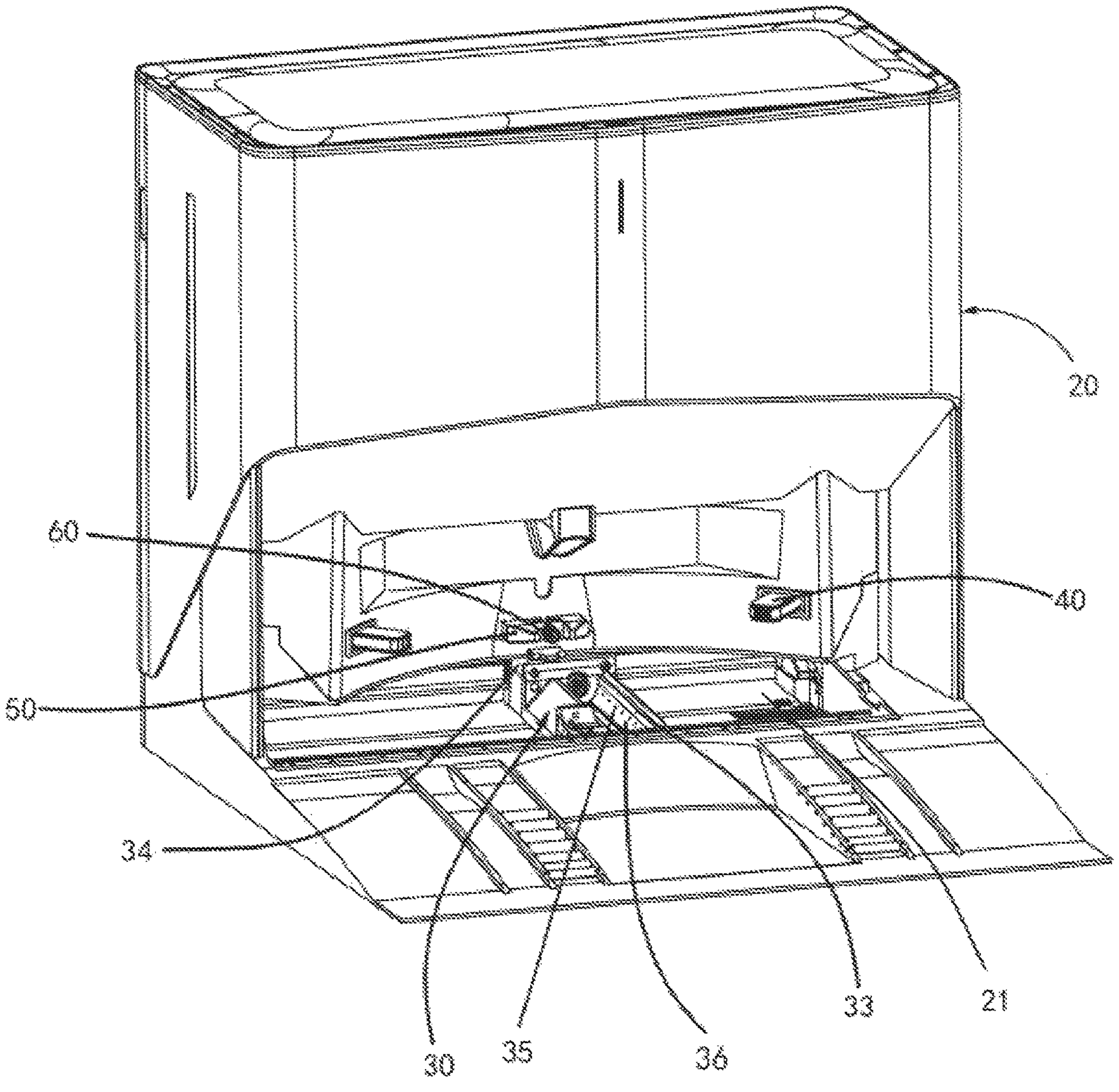
FIG. 11 is a schematic structural diagram illustrating a part of a base station according to an exemplary embodiment.

In an embodiment of the present disclosure, as shown in FIG. 11, the base station may include a base station body 20 and a cleaning component 30. The cleaning component 30 is movably disposed on the base station body 20. The base station body 20 may include a cleaning groove 21, and the cleaning component 30 includes a liquid outlet device 36. The cleaning liquid discharged by the liquid outlet device 36 is configured to clean the cleaning system 150 of the cleaning robot 10 and enter the cleaning groove 21.

In an embodiment of the present disclosure, the liquid outlet device 36 of the base station is movably disposed, so that the cleaning liquid may be sprayed or smeared to the cleaning system 150 of the cleaning robot 10 more evenly. Thus, it is ensured that the cleaning fluid soaks the cleaning system 150 in time if the cleaning component 30 cleans the cleaning system 150 of the cleaning robot 10.

In addition, in addition to realizing the cleaning of the cleaning system 150, it is also avoided that the cleaning liquid overflows and flows into the external environment, or flows onto relevant electrical components of the cleaning robot 10, thereby causing safety problems.

In an embodiment of the present disclosure, in a case that the cleaning robot 10 stays at the base station body 20 and keeps stationary, the cleaning component 30 is in contact with the cleaning system 150 of the cleaning robot 10 and moves relative to the base station body 20 and the cleaning robot 10. The cleaning liquid discharged from the liquid outlet device 36 soaks the cleaning system 150 of the cleaning robot 10 and may effectively clean the cleaning system 150 of the cleaning robot 10.

It should be noted that if the cleaning component 30 of the base station moves, the cleaning liquid discharged by the liquid outlet device 36 may be configured to clean the cleaning system 150 of the cleaning robot 10. That is, the debris on the cleaning system 150 of the cleaning robot 10 can be removed with the help of the cleaning liquid, and the cleaning system 150 is evenly soaked during the movement of the liquid outlet device 36.

In an embodiment of the present disclosure, as shown in FIG. 11, the cleaning component 30 may further include a cleaning component holder 33 movably disposed on the base station body 20, and the liquid outlet device 36 may be disposed on the cleaning component holder 33. That is to say, the cleaning component holder 33 serves as a moving part to ensure that the liquid outlet device 36 moves with it. Thus, it is ensured that the cleaning liquid is discharged from different positions and evenly wets an object to be cleaned.

In an embodiment of the present disclosure, the base station may further include a liquid delivery channel. One end of the liquid delivery channel is in communication with a liquid supply part 70, and the other end of the liquid delivery channel is in communication with the liquid outlet device 36, so that the liquid supply part 70 supplies the cleaning liquid into the liquid outlet device 36 via the liquid delivery channel. At least part of the liquid delivery channel is movably disposed along with the cleaning component holder 33. The liquid supply part 70 provides storage of the cleaning liquid, and the liquid delivery channel is a delivery part, so as to move along with the cleaning component holder 33.

In an embodiment of the present disclosure, the liquid delivery channel is a liquid delivery pipe, and the liquid delivery pipe is connected to the cleaning component holder 33. That is, the liquid outlet device 36 is disposed on the cleaning component holder 33, and two ends of the liquid delivery pipe are respectively in communication with the liquid supply part 70 and the liquid outlet device 36, so as to achieve liquid supply.

Optionally, the liquid delivery channel is provided with a pump. The cleaning liquid in the liquid supply part 70 is transported to the liquid outlet device 36 under the action of the pump, which ensures that the cleaning liquid has a certain impact force, thereby improving the cleaning capability. In an embodiment of the present disclosure, the controller disposed on the base station may control parameters such as liquid outlet frequency, liquid outlet flux, and liquid outlet duration. Besides, the controller may be further connected with the communication device of the base station. When the communication device receives instructions from the cleaning robot 10 or a remote controller, such as a computer terminal or a mobile application, operations of one or more elements on the base station can be controlled.

In an embodiment of the present disclosure, a plurality of liquid outlets 35 may be disposed on the liquid outlet device 36 at intervals, the cleaning liquid is discharged through the liquid outlet 35, and liquid may be discharged at multiple positions to improve cleaning efficiency.

Optionally, the liquid outlet device 36 may be integrated into the cleaning component holder 33, and the plurality of liquid outlets 35 is disposed on the cleaning component holder 33 at intervals, so as to realize liquid discharging at multiple positions. In other embodiments of the present disclosure, the liquid outlet device 36 may be also disposed separately on the cleaning component holder 33, so as to facilitate repair, replacement, and so on of the liquid outlet device 36.

Figure 13:
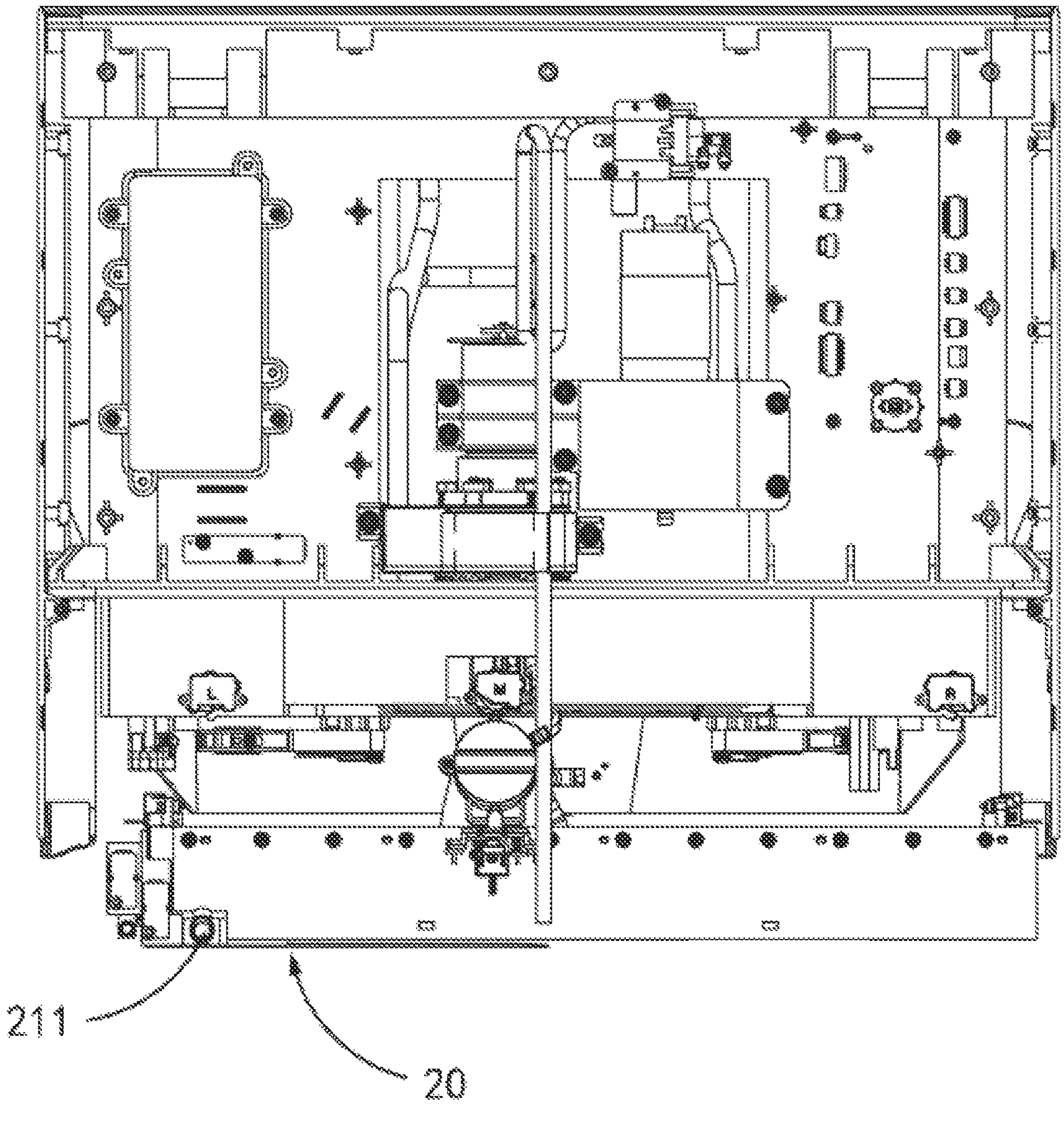
FIG. 13 is a schematic diagram illustrating the inner structure of a base station from a first perspective of view according to an exemplary embodiment.

In an embodiment of the present disclosure, as shown in FIG. 13, the cleaning groove 21 disposed below the cleaning component 30 may be provided with a liquid pumping port 211, and the cleaning liquid in the cleaning groove 21 may be discharged through the liquid pumping port 211, so as to ensure the cleaning liquid in the cleaning groove 21 to be replaced in time.

Figure 14:
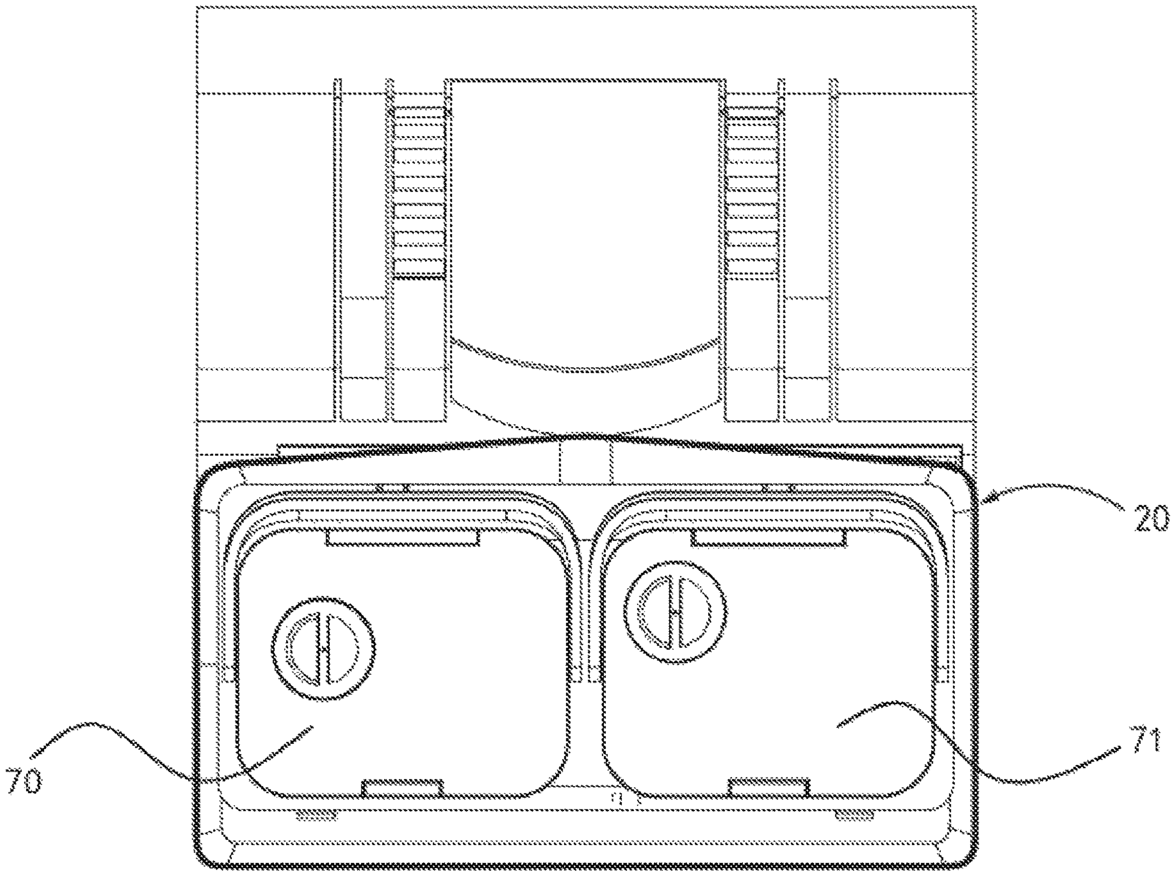
FIG. 14 is a schematic structural diagram illustrating a base station from a second perspective of view according to an exemplary embodiment.

In an embodiment of the present disclosure, as shown in FIG. 14, the base station further includes a collection container 71, and the collection container 71 is in communication with the cleaning groove 721 through the liquid pumping port 211, so that the waste liquid in the cleaning groove 21 flows into the collection container 71.

Specifically, as shown in FIG. 14, the base station further includes a liquid supply part 70, which is in communication with the liquid outlet 35 through the liquid delivery pipe, and is configured to provide the cleaning liquid for cleaning the cleaning system 150 of the cleaning robot 10.

In an embodiment of the present disclosure, the base station further includes a first pump and a second pump. The first pump is configured to pump the cleaning liquid into the cleaning groove 21. The second pump is configured to pump out the cleaning liquid from the cleaning groove 21. The first pump and the second pump respectively achieve the feeding and the pumping of the cleaning liquid, so as to ensure the replacement of the cleaning liquid in the cleaning groove 21 and ensure the cleaning effect.

The first pump is in communication with the liquid supply part 70, so that the cleaning liquid in the liquid supply part 70 is pumped into the cleaning groove 21 through the liquid outlet 35. The second pump is in communication with the collection container 71, so that the cleaning liquid in the cleaning groove 21 is pumped into the collection container 71 through the liquid pumping port 211.

In an embodiment of the present disclosure, the first pump and the second pump may be in operation at the same time. The first pump sprays the cleaning liquid into the cleaning groove 21, and the second pump pumps the cleaning liquid out from the cleaning groove 21. That is, the cleaning liquid flows rapidly in the cleaning groove 21.

Figure 12:
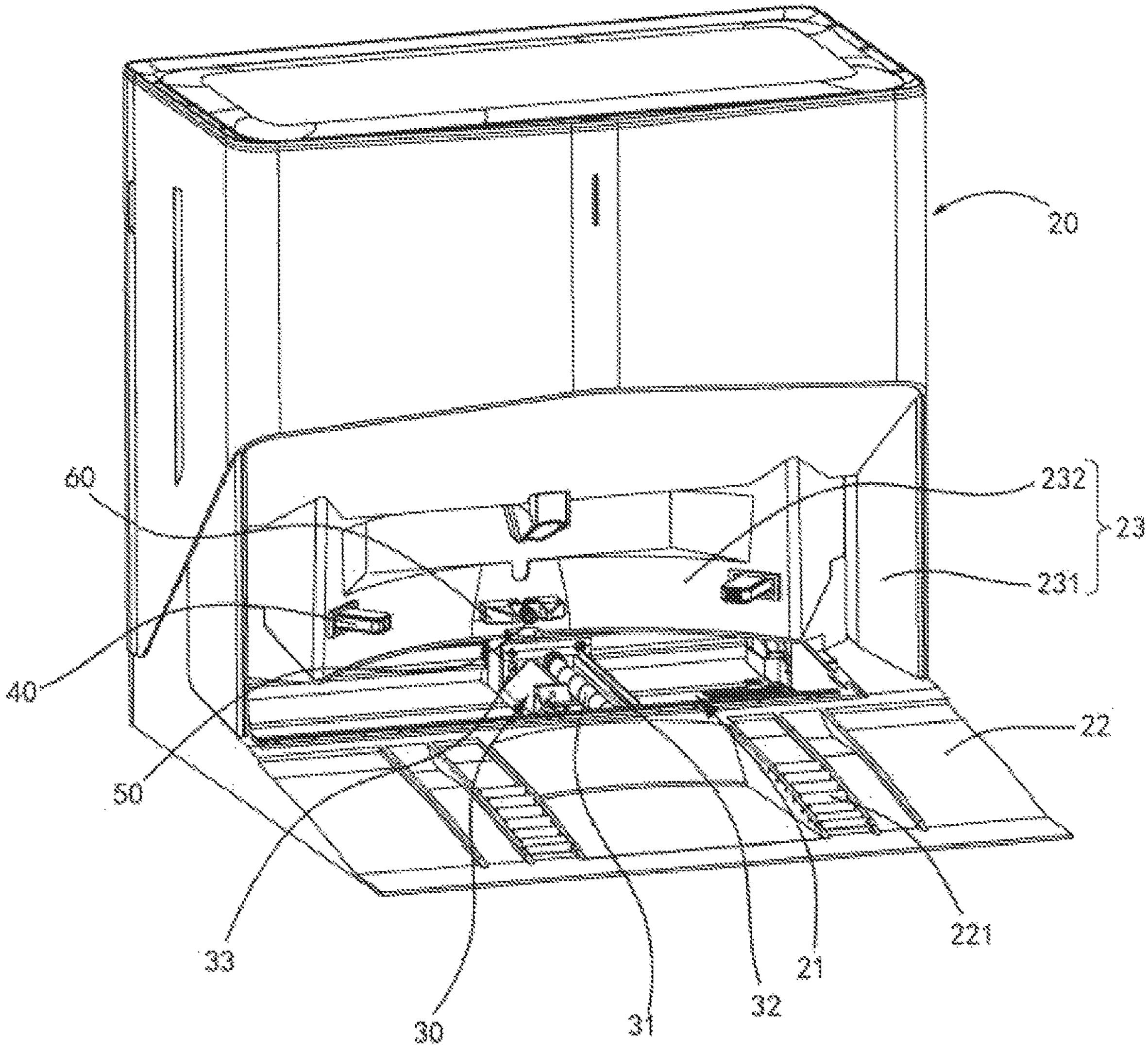
FIG. 12 is a schematic structural diagram illustrating a part of a base station according to an exemplary embodiment.
Figure 15A:
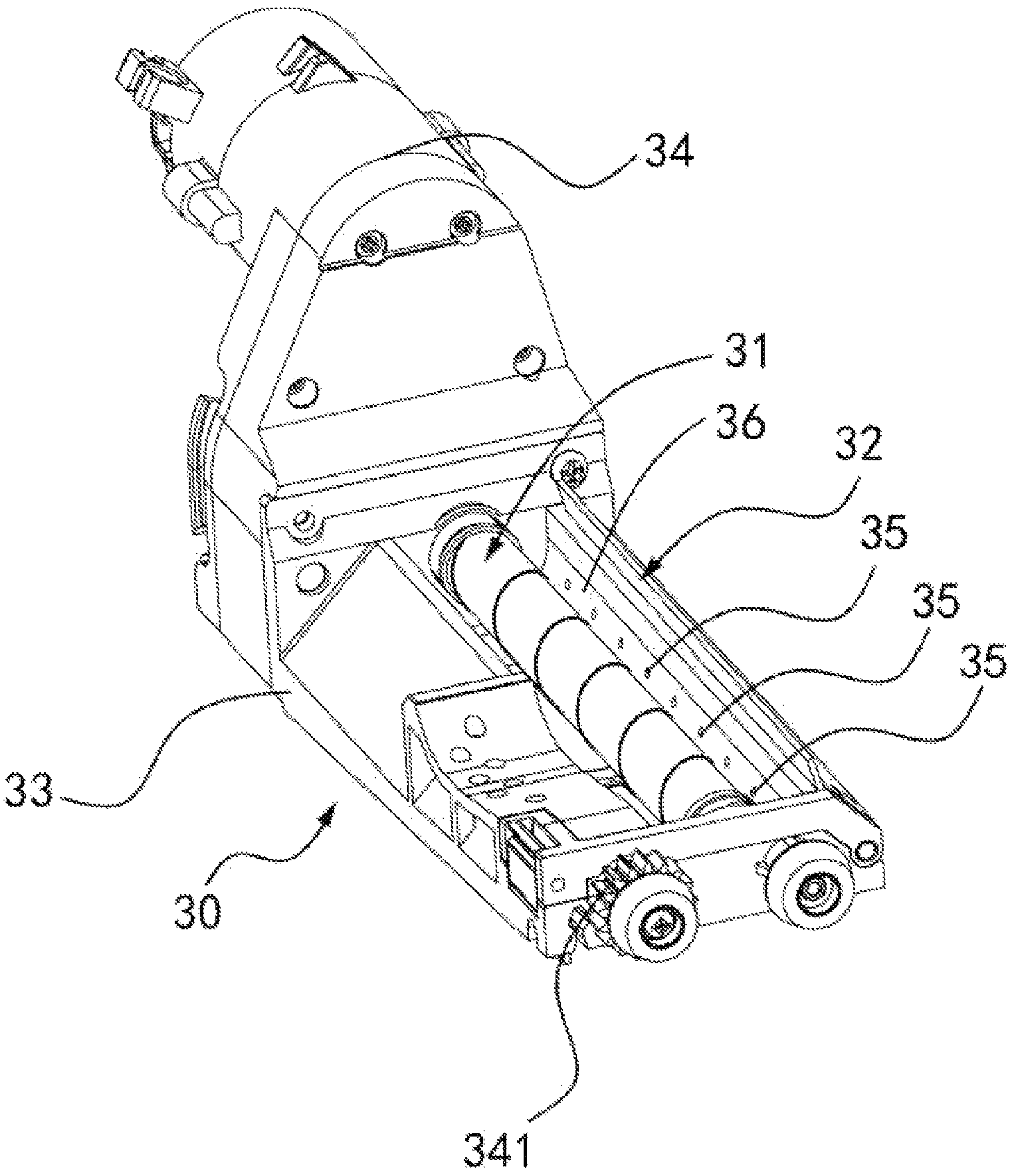
FIG. 15A is a schematic partial structural diagram illustrating a cleaning component of a base station according to an exemplary embodiment.

In an embodiment of the present disclosure, as shown in FIG. 12 and FIG. 15A, the cleaning component 30 further includes a cleaning part disposed on the cleaning component holder 33, wherein the cleaning part may be parallel to the liquid outlet device 36. This arrangement provides the cleaning component 30 with a compact structure, and the compact structure can ensure that the cleaning system 150 of the cleaning robot 10 is soaked in time by the cleaning liquid discharged by the liquid outlet device 36, if the cleaning part is performing a cleaning operation, thereby helping the cleaning part to clean the cleaning system 150 of the cleaning robot 10.

It should be noted that the cleaning part is parallel to the liquid outlet device 36. That is, an extension direction of the cleaning part is parallel to a straight line formed by connecting center points of the plurality of liquid outlets 35 of the liquid outlet device 36.

In an embodiment of the present disclosure, the cleaning component 30 may be disposed on the base station body 20 approximately horizontally, as shown in FIGS. 11 and 12. With such arrangement, the cleaning robot 10 may stay at the base station approximately horizontally and perform the cleaning operation, which reduces the risk of the cleaning robot falling out of the charging station due to an excessive tilt. In an embodiment of the present disclosure, the cleaning robot 10 may stay at the base station safely and bring the cleaning component 30 onto the cleaning part without any help from another device. In addition, since the cleaning component 30 is provided with the liquid outlet device 36 and the cleaning part, the approximate horizontal arrangement of the cleaning component 30 helps to better control the cleaning liquid so as to fall into the cleaning groove 21 smoothly, and prevent the cleaning liquid from sliding along the inclined cleaning component 30 toward outside of the groove.

In an embodiment of the present disclosure, as shown in FIG. 15A, the cleaning part may include a first cleaning part 31, the first cleaning part 31 is disposed on the cleaning component holder 33, and the first cleaning part 31 removes the debris from the cleaning system 150 of the cleaning robot 10 due to contact and movement relative to the cleaning system 150. In addition, the liquid outlet 35 on the liquid outlet device 36 may be disposed to face the first cleaning part 31. With this arrangement, the cleaning liquid discharged from the liquid outlet 35 may be sprayed to the first cleaning part 31 first, facilitating the first cleaning part 31 to uniformly spread the cleaning liquid to the cleaning system 150 of the cleaning robot 10. In other embodiments of the present disclosure, the cleaning liquid discharged from the liquid outlet 35 may also be directly sprayed to the cleaning system 150 of the cleaning robot 10, which is not limited in the present disclosure. In an embodiment of the present disclosure, the first cleaning part 31 may be a cleaning roller or the like that rotates around an axis parallel to the liquid outlet device 36, such as a brush roller or a soft rubber roller.

In an embodiment of the present disclosure, as shown in FIG. 15A, the cleaning part may further include a second cleaning part 32, the second cleaning part 32 is disposed on the cleaning component holder 33, and the second cleaning part 32 removes debris on the cleaning system 150 in cooperation with the first cleaning part 31 due to contact and movement relative to the cleaning system 150. The second cleaning part 32 may be disposed in parallel on any side of the first cleaning part 31. If there are multiple second cleaning parts 32, the second cleaning parts 32 may be distributed in parallel on any side or both sides of the first cleaning part 31. As shown in FIG. 15A, the second cleaning part 32 is disposed on a side of the first cleaning part 31 and above the liquid outlet device 36. In an embodiment of the present disclosure, the second cleaning part 32 may be a soft rubber scraper or the like.

Specifically, in a case that the cleaning robot 10 moves to the base station body 20, the cleaning component 30 is positioned opposite to the cleaning system 150, the cleaning component 30 moves relative to the base station body 20, and the first cleaning part 31 and/or the second cleaning part 32 may be in contact with the cleaning system 150, so as to remove debris on the cleaning system 150. That is, the cleaning robot 10 can perform automatic cleaning on the cleaning component 30.

In an embodiment of the present disclosure, as described above, the cleaning system 150 of the cleaning robot 10 may include a dry cleaning system 151 and a wet cleaning system 400. The following specifically introduces a cleaning process of the wet cleaning system 400 of the cleaning robot 10 by the cleaning component 30 of the base station.

As shown in FIG. 1, in a case that the cleaning robot 10 moves to the base station body 20, the wet cleaning system 400 of the cleaning robot 10 is fixedly disposed relative to the base station body 20. The cleaning component 30 of the base station is in contact with the cleaning head 410 of the wet cleaning system 400 of the cleaning robot 10. In other embodiments of the present disclosure, the wet cleaning system 400 of the cleaning robot 10 may realize vertical movement with the help of the active lifting module. Therefore, in a case that the cleaning robot 10 stops at the base station for the cleaning operation, the active lifting module may be adjusted to achieve better contact between the cleaning component 30 of the base station and the cleaning head 410 of the wet cleaning system 400 of the cleaning robot 10. For example, in an embodiment of the present disclosure, the wet cleaning system 400 of the cleaning robot 10 may be cleaned if it is fully lifted. In other embodiments of the present disclosure, the wet cleaning system 400 of the cleaning robot 10 may be also cleaned in other lifting states. The lifting state of the wet cleaning system 400 may be adjusted according to the material of the cleaning head 410 of the wet cleaning system 400. For example, in a case that the friction coefficient of the cleaning head 410 to be cleaned is small, the contact between the cleaning head 410 and the cleaning component 30 may be made closer. This ensures that if the cleaning component 30 moves relative to the base station body 20, the friction between the cleaning head 410 and the cleaning component 30 is within a certain range, which facilitates the proceeding of the cleaning operation;

and vice versa. In addition, the lifting state of the wet cleaning system 400 may be adjusted according to the degree of contamination of the cleaning head 410 of the wet cleaning system 400. For example, in a case that the cleaning head 410 to be cleaned is relatively dirty, the contact between the cleaning head 410 and the cleaning component 30 may be made closer. Thus, a greater friction force is generated between the cleaning head 410 and the cleaning component 30 to ensure that the debris on the cleaning head 410 is effectively removed; and vice versa. In an embodiment of the present disclosure, the lifting state of the wet cleaning system 400 may be adjusted by the user according to the actual situation. Alternatively, a sensor may be disposed at a specific location, such as the cleaning head 410 of the wet cleaning system 400, and the sensor outputs a specific signal to the control module 130 of the cleaning robot 10. The control module 130 automatically adjusts the lifting state of the wet cleaning system 400 according to a feedback result of the sensor. In other embodiments of the present disclosure, the lifting state of the wet cleaning system 400 may be also adjusted in other ways, which is not limited in the present disclosure.

In a case that the cleaning robot 10 is fixed on the base station body 20, and the cleaning head 410 of the wet cleaning system 400 of the cleaning robot 10 is in good contact with the cleaning component 30 of the base station, the cleaning component 30 may perform cleaning on the wet cleaning system 400 of the cleaning robot 10. In an embodiment of the present disclosure, as shown in FIG. 15A, the cleaning component 30 includes the first cleaning part 31 in the form of roller and the second cleaning part 32 in the form of scraper. During the cleaning process of the wet cleaning system 400 of the cleaning robot 10 by the cleaning component 30, the liquid outlet device of the cleaning component 30 may be in operation at the same time to spray the cleaning liquid onto the first cleaning part 31. The first cleaning part 31 evenly spreads the cleaning liquid onto the cleaning head 410 of the wet cleaning system 400 through contact with the cleaning head 410 of the wet cleaning system 400 of the cleaning robot 10 and its own rotation. In addition, the first cleaning part 31 may be a brush roller or a soft rubber roller with blades. The cleaning head 410 of the wet cleaning system 400 of the cleaning robot 10 may be composed of a soft cloth made of fiber material or cotton, or a sponge. During the cleaning process, the bristles or blades of the first cleaning part 31 may penetrate deeply into the cleaning head 410 and is fully contact with it, thereby bringing out the debris in the cleaning head 410 of the wet cleaning system 400. In addition, the first cleaning part 31 may rotate while moving left and right, and its bristles or blades may produce a flapping effect on the cleaning head 410 of the wet cleaning system 400 during rotation. This causes the debris contained within the cleaning head 410 to be shaken out and scraped off by the vibration generated by the flapping effect. At the same time, in cooperation with the operation of the first cleaning part 31, the scraper of the second cleaning part 32 scrapes the debris that is taken out or shaken out of the cleaning head 410 of the wet cleaning system 400, and also scrapes the waste liquid on the cleaning head 410. In other embodiments of the present disclosure, the first cleaning part 31 may move left and right while rotating in different directions. For example, in a case that the first cleaning part 31 moves to the left relative to the base station body 20, it may rotate clockwise at the same time. In a case that the first cleaning part 31 moves to the right relative to the base station body 20, it may rotate counterclockwise at the same time.

As mentioned above, the wet cleaning system 400 of the cleaning system 150 may reciprocate relative to the base station body 20. In an embodiment of the present disclosure, during the movement of the cleaning component 30 relative to the base station body 20, the wet cleaning system 400 of the cleaning robot 10 may be stationary, or the wet cleaning system 400 may also perform the corresponding reciprocating motion to be in cooperation with the motion of the cleaning component 30. This ensures that the wet cleaning system 400 can be cleaned quickly. For example, in a case that the cleaning component 30 moves to the left relative to the base station body 20, the wet cleaning system 400 of the cleaning robot 10 may move to the right relative to the base station body 20, so as to increase the relative motion speed between the cleaning component 30 and the wet cleaning system 400 for improving the cleaning efficiency; and vice versa.

In an embodiment of the present disclosure, the first cleaning part 31 and the second cleaning part 32 are synchronously and movably disposed. As shown in FIG. 15A, the first cleaning part 31 and the second cleaning part 32 are both disposed on the cleaning component holder 33 of the cleaning component 30. Thus, the cleaning component holder 33 drives the first cleaning part 31 and the second cleaning part 32 to move synchronously with the same moving direction, and the first cleaning part 31 and the second cleaning part 32 sequentially complete the cleaning of the cleaning system 150. In other embodiments of the present disclosure, the first cleaning part 31 and the second cleaning part 32 may be respectively disposed on different holders. With such arrangement, by separately controlling the movement of the holders, motions of the first cleaning part 31 and the second cleaning part 32 can be controlled separately, and the asynchronous movements of the first cleaning part 31 and the second cleaning part 32 can be realized. For example, the first cleaning part 31 or the second cleaning part 32 may be operated independently. Alternatively, a time difference may be formed according to the actual situation in a case that the first cleaning part 31 and the second cleaning part 32 are implemented to clean at the same position of the cleaning head 410. The present application is not limited in this regard.

As mentioned above, the cleaning component 30 may include one or more first cleaning parts 31 and second cleaning parts 32. For example, in an embodiment of the present disclosure, the cleaning component 30 may include two first cleaning parts 31 and one second cleaning part 32, wherein the first cleaning parts 31 are respectively disposed on two sides of the second cleaning part 32, as shown in FIG. 15C. In an embodiment, during the reciprocating motion of the cleaning component 30, the first cleaning part 31 may always be in front of the second cleaning part 32. This arrangement enables the cleaning component 30 to clean firstly the portions to be cleaned of the cleaning head 410 during the cleaning process of the cleaning head 410 of the wet cleaning system 400 of the cleaning robot 10. That is, the bristles or blades of the first cleaning part 31 produce the flapping effect on the cleaning head 410 during the rotation of the first cleaning part 31, causing the debris contained in the cleaning head 410 to be shaken out and scraped off by the vibration generated by the flapping effect. Subsequently, the scraper of the second cleaning part 32 scrapes off the debris taken out or shaken out of the cleaning head 410 and the waste liquid on the cleaning head 410, so as to ensure that the cleaning head 410 can be cleaned more thoroughly.

In some embodiments of the present disclosure, by controlling the height of the liquid level in the cleaning groove

21, the first cleaning part 31 and the second cleaning part 32 may be partially immersed in the cleaning liquid in the cleaning groove 21, completely immersed in the cleaning liquid, or not immersed in the cleaning liquid at all.

In a case that the first cleaning part 31 and the second cleaning part 32 are partially immersed in the cleaning liquid in the cleaning groove 21, the first cleaning part 31 performs the reciprocating motion while rotating. During the rotation of the first cleaning part 31, the cleaning liquid in the cleaning groove 21 may be taken out and applied to the cleaning head 410 of the wet cleaning system 400 of the cleaning robot 10. Thus, the cleaning head 410 may be cleaned in a case that the liquid outlet device of the base station is not in operation. In addition, during the reciprocating motions of the first cleaning part 31 and the second cleaning part 32, the impurities thereon may be removed under the washing of the liquid flow.

In a case that the first cleaning part 31 and the second cleaning part 32 are all immersed in the cleaning liquid in the cleaning groove 21, that is, the cleaning head 410 of the wet cleaning system 400 of the cleaning robot 10 may be immersed in the cleaning liquid in the cleaning groove 21, the cleaning head 410 may use the cleaning liquid in the cleaning groove 21 to perform cleaning if the liquid outlet device of the base station is not in operation. In addition, during the reciprocating motions of the first cleaning part 31 and the second cleaning part 32, the impurities thereon may be removed under the washing of the liquid flow.

In a case that the first cleaning part 31 and the second cleaning part 32 are not immersed in the cleaning liquid in the cleaning groove 21 at all, the cleaning head 410 of the wet cleaning system 400 of the cleaning robot 10 completely uses the cleaning liquid sprayed by the liquid outlet device of the base station for cleaning. Thereby, it is ensured that the cleaning head 410 is not secondarily contaminated by the debris in the cleaning groove 21, which may be applied to the situation where the cleaning head 410 is seriously dirty, and may be also applied to the situation where the cleaning fluid in the cleaning groove 21 has been used for too many times and has not been replaced.

Figure 16:
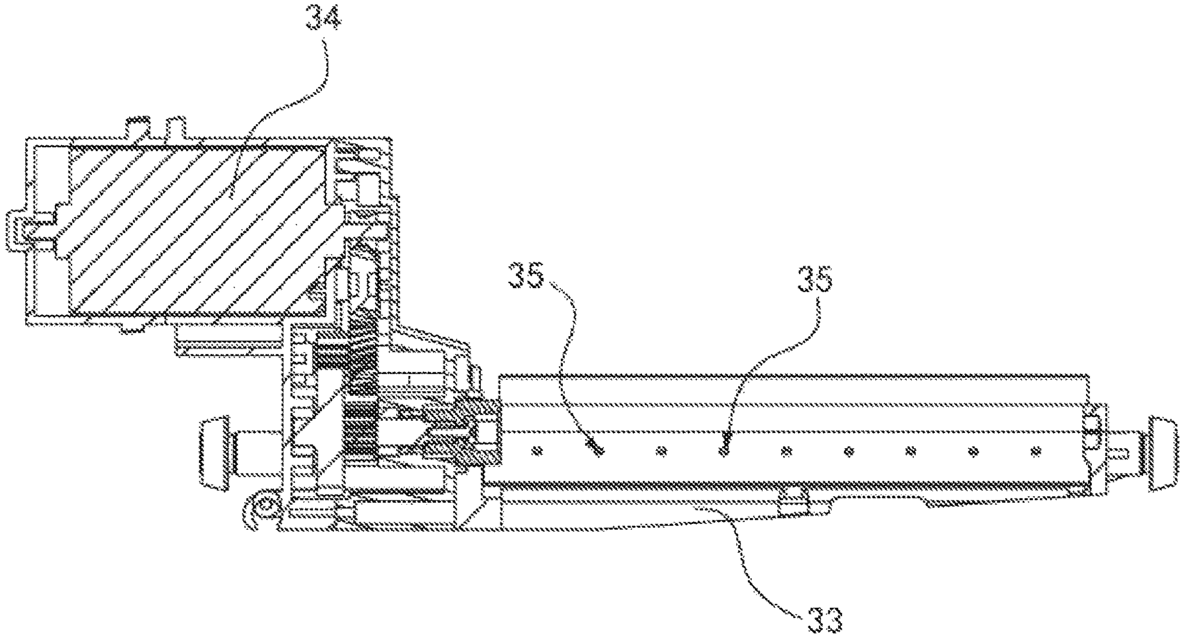
FIG. 16 is a schematic cross-sectional structural diagram illustrating a cleaning component of a base station according to an exemplary embodiment.

In an embodiment of the present disclosure, as shown in FIG. 15A and FIG. 16, the base station further includes a driving part 34, connected to the cleaning component holder 33, and connected to the base station body 20, so as to drive the cleaning component holder 33 to move relative to the base station body 20.

Figure 15B:
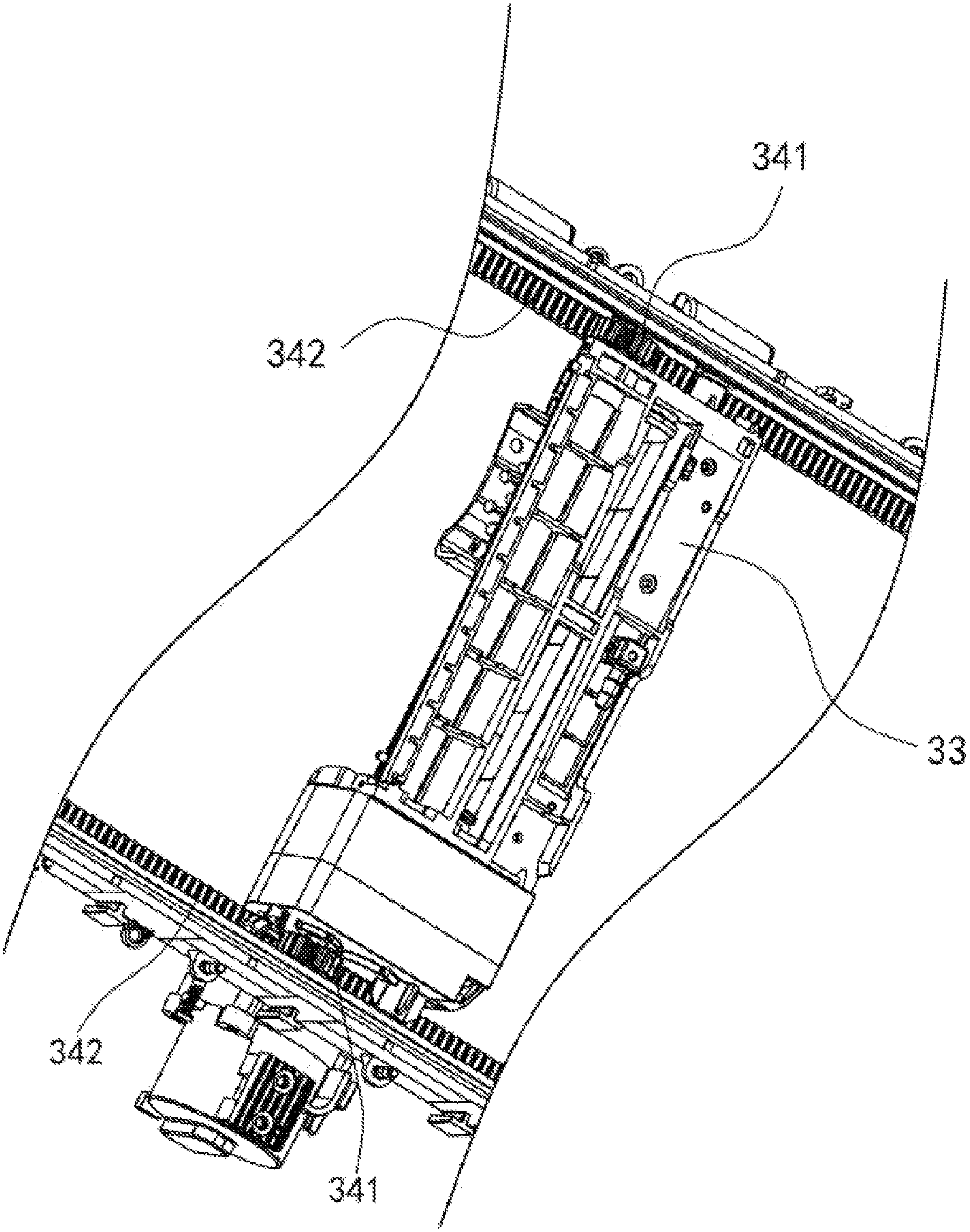
FIG. 15B is a schematic partial structural diagram illustrating a cleaning component of a base station according to an exemplary embodiment.
Figure 15C:
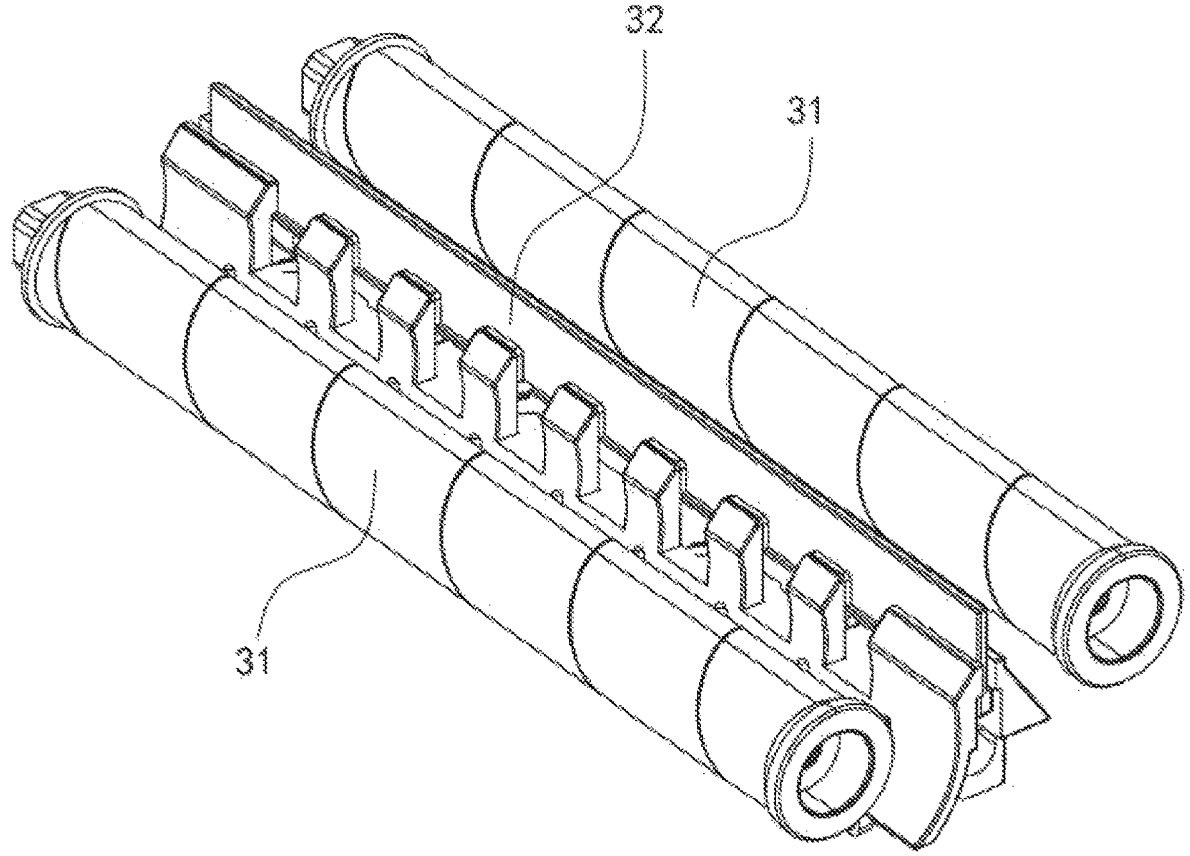
FIG. 15C is a schematic partial structural diagram illustrating a cleaning component of a base station according to another exemplary embodiment.

Optionally, as shown in FIGS. 15A and 15B, the driving part 34 and the cleaning component holder 33 move synchronously with respect to the base station body 20. That is, the driving part 34 may include a motor and a gear 341, wherein the motor drives the gear 341 to rotate. A rack 342 may be disposed on the base station body 20, so that the gear 341 moves along the extending direction of the rack 342, and the driving part 34 and the cleaning component holder 33 move synchronously on the base station body 20. Optionally, racks 342 are disposed on both sides of the cleaning component holder 33. Accordingly, there may be at least two gears 341, and the at least two gears 341 mesh with the two racks 342 respectively.

In addition, as described above, in a case that the cleaning component 30 moves relative to the base station body 20, the first cleaning part 31 of the cleaning component 30 also rotates by itself. In an embodiment of the present disclosure, one motor may be configured to drive the cleaning component 30 to move relative to the base station body 20 and at the same time to drive the first cleaning part 31 to rotate by itself. Specifically, an output shaft of the motor is connected to the gear 341 and the first cleaning part 31 through a gear transmission component. Thus, in a case that the motor is running, the motor drives the gear 341 and the first cleaning part 31 to rotate at the same time. In this case, the gear 341 moves along the extending direction of the rack, and the first cleaning part 31 rotates by itself. The gear transmission component is configured according to the actual requirements in rotating speed, and there is no limitation here. The gear transmission component includes a gear and a connection shaft. Further, the gear transmission component may also include a conveyor belt or a chain, etc., which is not limited here, as long as the motor can be ensured to simultaneously drive the gear 341 and the first cleaning part 31 to rotate. In some embodiments of the present disclosure, it is not excluded that two motors are configured to drive the movement of the cleaning component 30 relative to the base station body 20 and the rotation movement of the first cleaning part 31 respectively.

Optionally, the driving part 34 may be fixed to the base station body 20, and the driving part 34 may be an air cylinder or an oil cylinder. A telescopic rod of the driving part 34 is connected to the cleaning component holder 33, so that the cleaning component holder 33 is driven to move on the base station body 20 due to the extension and retraction of the telescopic rod. In other embodiments of the present disclosure, the driving part 34 may also be an electric cylinder, or configured in such a way that the motor and the conveyor belt cooperate with each other, as long as it can drive the cleaning component holder 33 to move, which is not limited in the present disclosure. As mentioned above, the first cleaning part 31 and the second cleaning part 32 in an embodiment of the present disclosure may be located on different holders, so as to realize the asynchronous movements of the two. For this reason, the holders of the first cleaning part 31 and the second cleaning part 32 may be provided with independent driving parts, which is not limited in the present disclosure.

Figure 15D:
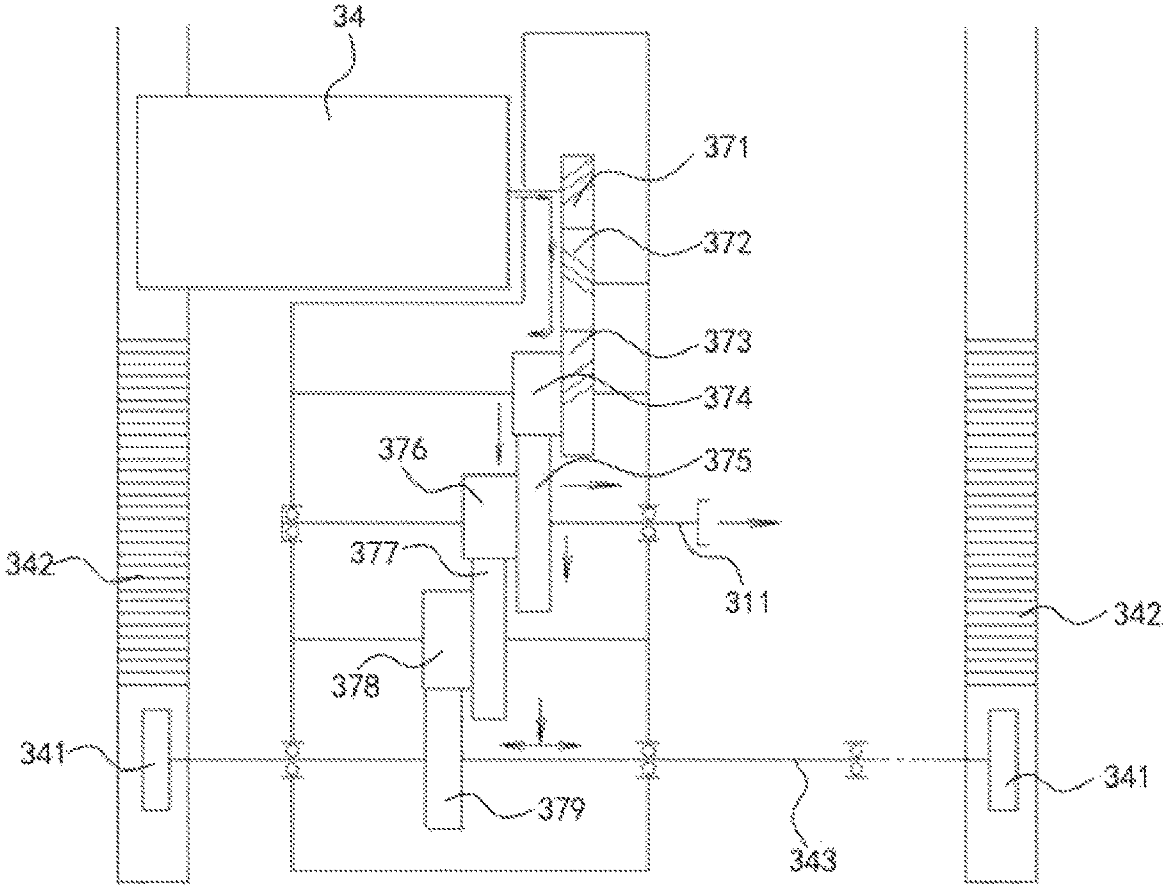
FIG. 15D is a schematic partial structural diagram illustrating a cleaning component of a base station according to another exemplary embodiment.

In an embodiment of the present disclosure, the left and right movement of the cleaning component 30 relative to the base station body 20 and the rotation of the first cleaning part 31 are driven by the same driving part, as shown in FIG. 15D. In an embodiment, the left and right movement of the cleaning component 30 and the rotation of the first cleaning part 31 are realized by the driving part 34 in cooperation with a multi-stage gear. In an embodiment, the driving part 34 may be a motor, and the cleaning component 30 may also include a gear transmission component. The motor drives the cleaning component holder 33 to move through the gear transmission component while the first cleaning part 31 rotates. That is, the gear 341 and the first cleaning part 31 are driven to rotate synchronously.

As shown in FIG. 15D, the gear transmission component includes a first gear 371, a second gear 372, a third gear 373, a fourth gear 374, a fifth gear 375, a sixth gear 376, a seventh gear 377, an eighth gear 378, and a ninth gear 379. The motor is connected to the first gear 371, the first gear 371 is meshed with the second gear 372, the second gear 372 is meshed with the third gear 373, and the second gear 372 is located between the first gear 371 and the third gear 373. Therefore, in a case that the motor drives the first gear 371 to rotate, the first gear 371 drives the third gear 373 to rotate through the second gear 372. The fourth gear 374 is connected to the third gear 373, and the fourth gear 374 and the third gear 373 are coaxially disposed, so that the third gear 373 drives the fourth gear 374 to rotate synchronously. The fourth gear 374 is meshed with the fifth gear 375 to drive the fifth gear 375 to rotate. The sixth gear 376 is connected to the fifth gear 375, and the sixth gear 376 and the fifth gear 375 are coaxially disposed, so that the fifth gear 375 drives the sixth gear 376 to rotate synchronously. A first rotating shaft 311 connected to the sixth gear 376 and the fifth gear 375 drives the first cleaning part 31 to rotate. The sixth gear 376 is meshed with the seventh gear 377 to drive the seventh gear 377 to rotate. The eighth gear 378 is connected to the seventh gear 377, and the eighth gear 378 and the seventh gear 377 are coaxially disposed, so that the seventh gear 377 drives the eighth gear 378 to rotate coaxially. The eighth gear 378 is meshed with the ninth gear 379 to drive the ninth gear 379 to rotate. A second rotating shaft 343 connected to the ninth gear 379 drives the gear 341 disposed thereon to rotate, so that the gear 341 moves along the rack 342.

In an embodiment, the motor may realize forward rotation and reverse rotation, and accordingly, the cleaning component holder 33 may be driven to move in two opposite directions, while the first cleaning part 31 may be also driven to rotate in two directions (i.e., clockwise rotation and counterclockwise rotation). For example, the motor may drive the cleaning component holder 33 to move to left relative to the base station body 20, while driving the first cleaning part 31 to rotate clockwise. The motor may also drive the cleaning component holder 33 to move to right relative to the base station body 20, while driving the first cleaning part 31 to rotate counterclockwise. It should be noted that the types and sizes of the gears are not limited here, and may be selected according to actual needs.

In an embodiment of the present disclosure, the liquid outlet 35 of the liquid outlet device 36 may face at least one of the first cleaning part 31 and the second cleaning part 32, and the cleaning liquid discharged from the liquid outlet 35 may impact on at least one of the first cleaning part 31 and the second cleaning part 32. That is, the liquid outlet 35 not only serves as a channel for the cleaning liquid to enter the cleaning groove 21, but the liquid outlet 35 may also make the liquid flow impact on at least one of the first cleaning part 31, the second cleaning part 32, and the cleaning head 410 of the wet cleaning system 400 of the cleaning robot 10, in order to achieve cleaning accordingly.

In an embodiment of the present disclosure, the first cleaning part 31 and the second cleaning part 32 are disposed side by side, and the liquid outlet 35 of the liquid outlet device 36 is located below the second cleaning part 32 and faces the first cleaning part 31. The liquid outlet 35 sprays the cleaning liquid in the liquid supply part 70 to the first cleaning part 31, and interacts with the cleaning head 410 of the wet cleaning system 400 of the cleaning robot 10 due to rotation of the first cleaning part 31, so as to apply the cleaning liquid to the cleaning head 410. In other embodiments of the present disclosure, a liquid outlet direction of the liquid outlet 35 of the liquid outlet device 36 may be directed toward the cleaning head 410, and the cleaning liquid is sprayed directly to the cleaning head 410. The impact of the cleaning liquid on the cleaning head 410 is configured to cooperate with the first cleaning part 31 and the second cleaning part 32 so as to realize the cleaning of the cleaning head 410.

In addition, in other embodiments of the present disclosure, the liquid outlet device 36 and the cleaning component 30 (that is, the first cleaning part 31 and the second cleaning part 32) may be separately disposed. With such arrangement, if some parts cannot operate, other parts are not affected. For example, the base station may only use the liquid outlet device 36 to complete the cleaning of the cleaning head 410. That is, the impact of the cleaning liquid on the cleaning head 410 is used completely to achieve the cleaning of the cleaning head 410.

In an embodiment of the present disclosure, a plurality of liquid outlets 35 may be disposed on the liquid outlet device 36, and the plurality of liquid outlets 35 may be in operation at the same time, or may discharge the cleaning liquid sequentially according to a preset rule. That is, the plurality of liquid outlets 35 does not discharge the cleaning liquid at the same time. For example, different pumps or valves may be configured to control the liquid discharge time and frequency of different liquid outlets 35. Such arrangement may adapt the base station suitable to different shapes and sizes of the cleaning heads 410. For example, in a case that the cleaning area of the cleaning head 410 is small, a part of the plurality of liquid outlets 35 may be controlled to operate, so as to avoid the waste of cleaning liquid.

The above is mainly directed to the cleaning of the cleaning head 410 of the wet cleaning system 400 of the cleaning robot 10. In other embodiments of the present disclosure, the base station may also clean other elements of the cleaning robot 10, which is not limited in the present disclosure.

In an embodiment of the present disclosure, as shown in FIG. 11 and FIG. 12, the base station further includes a liquid filling connector 50 disposed on the base station body 20. The liquid filling connector 50 is configured to connect with the liquid filling port 16 of the liquid container 13 of the cleaning robot 10, so as to realize the liquid filling into the liquid container 13 of the cleaning robot 10.

In an embodiment of the present disclosure, the cleaning robot 10 may move to and stay at the base station body 20, as shown in FIG. 1, to perform subsequent liquid filling.

In an embodiment, in a case that the cleaning robot 10 moves to the base station body 20, the liquid filling connector 50 of the base station may be connected to the liquid filling port 16 of the cleaning robot 10, so that the base station supplies the liquid into the liquid container 13 through the liquid filling connector 50.

In an embodiment of the present disclosure, since the cleaning robot 10 may swing slightly from side to side during docking at the base station, in order to align the liquid filling connector 50 of the base station better with the liquid filling port 16 of the liquid container 13 of the cleaning robot 10, at least part of the liquid filling connector 50 of the base station is movably disposed. For example, the liquid filling connector 50 is made of a flexible material, or the liquid filling connector 50 is disposed on the flexible material.

Figure 17:
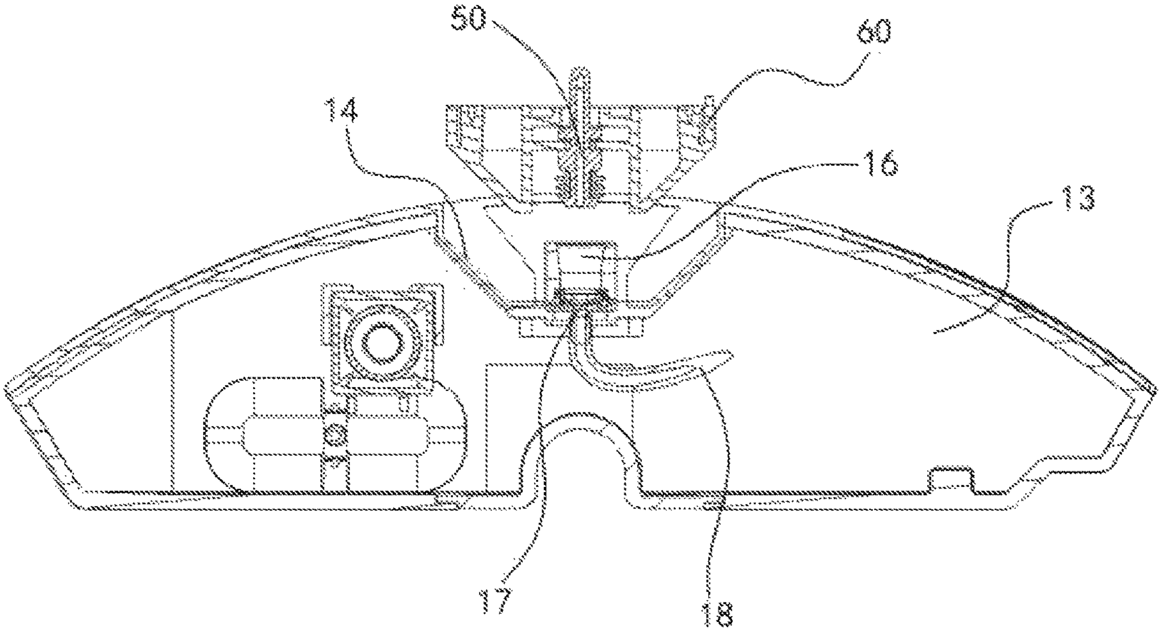
FIG. 17 is a schematic diagram illustrating a separated structure of a liquid container, a liquid filling connector, and a first fixture part of a cleaning robot system according to an exemplary embodiment.
Figure 18:
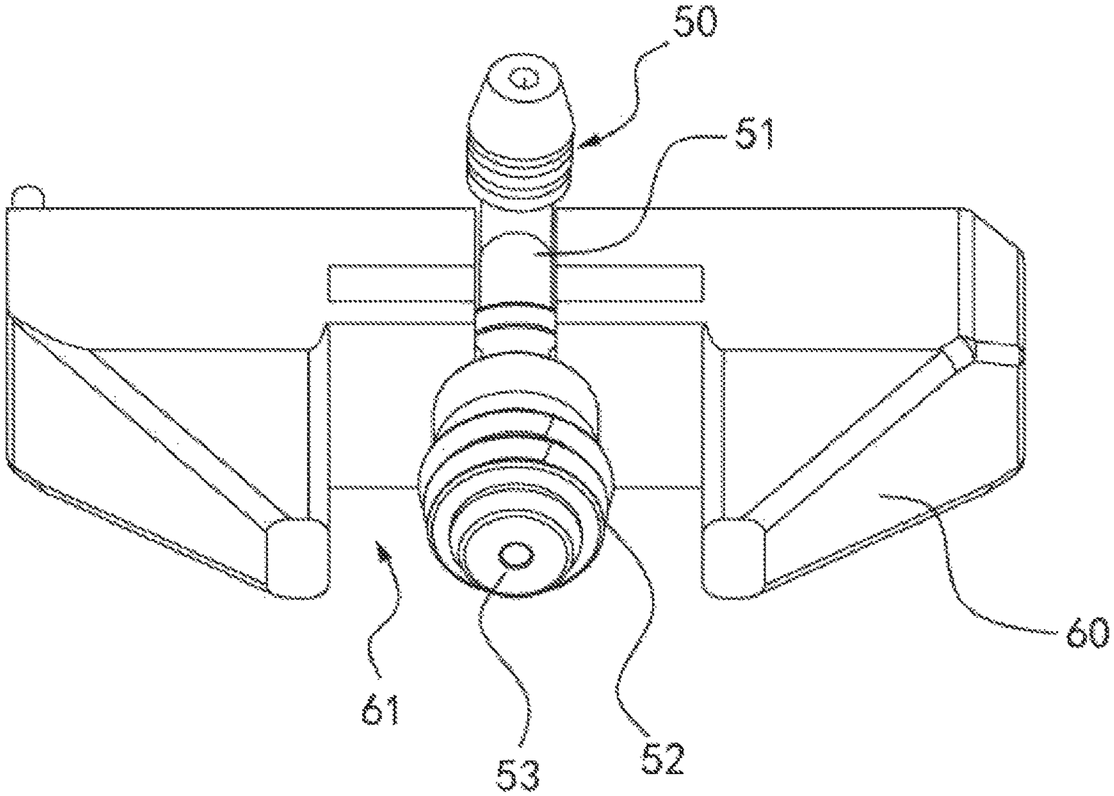
FIG. 18 is a schematic structural diagram illustrating a liquid filling connector and a first fixture part of a base station according to an exemplary embodiment.

In an embodiment of the present disclosure, as shown in FIGS. 17 and 18, the liquid filling connector 50 includes: a body part 51 connected to the base station body 20; a sealing part 52, one end of the sealing part 52 being connected to the body part 51; and a joint part 53, connected to the other end of the sealing part 52 away from the body part 51. The joint part 53 is connected to the liquid container 13, and the sealing part 52 is made of a flexible material.

Specifically, the body part 51 is a main flow path of the liquid, the joint part 53 is a hard interface part for connecting with the liquid filling port 16 of the liquid container 13 of the cleaning robot 10, and the sealing part 52 is a soft structure. By disposing the soft sealing part 52, the liquid filling connector 50 may move radially and axially, which facilitates alignment with the liquid filling port 16 of the liquid container 13.

In an embodiment of the present disclosure, as shown in FIG. 17, the liquid filling port 16 is configured to match with the liquid filling connector 50. That is, one end of the liquid filling connector 50 may be inserted into the liquid filling port 16, and further, the joint part 53 of the liquid filling connector 50 is inserted into the liquid filling port 16. As mentioned above, a valve is disposed at the liquid filling port 16 of the cleaning robot 10. For example, a cross valve is disposed at the liquid filling port 16. In a case that the liquid filling connector 50 of the base station is aligned with the liquid filling port 16 of the cleaning robot 10, the base station starts to fill liquid into the liquid container 13 through the liquid filling port 16. The cross valve is opened under the action of the liquid pressure from the liquid filling connector 50, so that the liquid filling port 16 is in communication with the liquid container 13, and the cleaning liquid flows into the liquid container 13. In a case that the liquid filling is completed, the liquid pressure at the liquid filling port 16 from the liquid filling connector 50 disappears, and the cross valve is closed. Thus, the liquid filling port 16 is disconnected with the liquid container 13, thereby avoiding the cleaning liquid in the liquid container 13 from overflowing.

In an embodiment of the present disclosure, it is also possible to apply a forward driving force onto the driving wheel of the cleaning robot 10, if the cleaning robot 10 stays at the base station to fill liquid into the liquid container 13. During the process of filling liquid into the liquid container 13, the liquid filling connector 50 of the base station generates a backward thrust on the cleaning robot 10 while discharging liquid, rendering the cleaning robot 10 to tend to move backward. Increasing the forward driving force on the driving wheel may offset at least a part of the thrust, thereby ensuring that the cleaning robot 10 is more stable if filling the liquid container 13 with liquid. In other embodiments of the present disclosure, it may be determined, by the liquid discharge speed of the liquid filling connector 50, the mass of the cleaning robot 10 itself, or the friction between the driving wheel and the staying surface of the base station if the cleaning robot 10 stays at the base station, whether the forward driving force is increased or not, and what the magnitude of the driving force is, which are not limited in the present disclosure.

In order to enable the liquid container 13 of the cleaning robot 10 to be filled with cleaning liquid in time, a sensor may be disposed on the cleaning robot 10 to detect the change in liquid level in the liquid container 13. For example, a float containing a magnetic element may be disposed in the liquid container 13, and one or more magnetic induction elements may be disposed on the liquid container 13 or the robot body of the cleaning robot 10, so as to detect the change in liquid level in the liquid container 13. In a case that the liquid level in the liquid container 13 is lower than a predetermined threshold, the cleaning robot 10 may automatically return to the base station to fill liquid, or the cleaning robot 10 may alert the user by an app or voice, and the user controls the cleaning robot 10 to return to the base station for liquid filling. In other embodiments of the present disclosure, the change in liquid level in the liquid container 13 may also be detected by other means, such as an infrared sensor. In other embodiments of the present disclosure, other control methods may be also configured to help the cleaning robot 10 returning to the base station for liquid filling. For example, the cleaning robot 10 may automatically return to the base station to fill liquid after completing the task for cleaning a designated cleaning area or the task for cleaning a designated region. The present disclosure is not limited in this respect. In addition, in combination with the foregoing, the liquid container 13 may be filled with liquid while the cleaning head 410 of the wet cleaning system 400 of the cleaning robot 10 is cleaned.

In an embodiment of the present disclosure, as shown in FIGS. 17 and 18, the base station further includes a first fixture part 60, disposed on the base station body 20 and used for connection with a second fixture part 14 on the liquid container 13.

Specifically, in a case that the cleaning robot 10 moves to the base station body 20, and the first fixture part 60 is connected to the second fixture part 14, the liquid filling connector 50 is connected to the liquid container 13. At this time, the liquid container 13 is filled with liquid through the liquid filling connector 50.

In an embodiment of the present disclosure, as shown in FIG. 18, the first fixture part 60 is formed with an accommodation part 61, and one end of the liquid filling connector 50 for connecting with the liquid container 13 is located within the accommodation part 61. In a case that the first fixture part 60 is connected to the second fixture part 14, the liquid filling connector 50 located within the accommodation part 61 may be reliably connected with the liquid filling port 16 of the liquid container 13.

In an embodiment of the present disclosure, as shown in FIG. 17, the second fixture part 14 is a groove, and the groove is configured to match with the first fixture part 60. That is, the first fixture part 60 is inserted into the groove, so that the liquid filling connector 50 and the liquid filling port 16 are reliably connected. An outer surface of the first fixture part 60 may be a sloped surface to facilitate insertion into the groove. In the case where the cleaning robot 10 and the base station body 20 are not completely aligned, the first fixture part 60 may also be introduced into the second fixture part 14.

In an embodiment of the present disclosure, the liquid supply part 70 may be in communication with the liquid filling connector 50, and the liquid supply part 70 supplies liquid into the liquid container 13 through the liquid filling connector 50. The liquid supply part 70 is configured to contain the cleaning liquid, and the liquid in the liquid supply part 70 may be fed into the liquid container 13 through the liquid filling connector 50.

Optionally, the liquid supply part 70 may be selectively in communication with the liquid filling connector 50 or the liquid outlet 35. That is, the liquid supply part 70 may fill liquid into the liquid container 13 through the liquid filling connector 50, or the liquid supply part 70 may supply the cleaning liquid into the cleaning groove 21 through the liquid outlet 35 of the liquid outlet device 36. The first pump is configured to pump the cleaning liquid into the cleaning groove 21, or the first pump is configured to pump the liquid into the liquid filling connector 50, so as to fill the liquid container 13 with liquid.

It should be noted that the liquid discharged from the liquid supply part 70 may be shunted into two channels, wherein one channel is in communication with the liquid filling connector 50, and the other channel is in communication with the liquid outlet 35. The liquid supply part 70 may be selectively in communication with two channels, so as to control the liquid filling to the liquid filling connector 50 or the liquid outlet 35. The two channels may be respectively provided with valves, and opening and closing of the valves are controlled to control the disconnection and the communication between the two channels. Alternatively, a three-way valve may be disposed. That is, a three-way valve is configured to control the liquid supply part 70 to be in communication with the respective channel.

Figure 2:
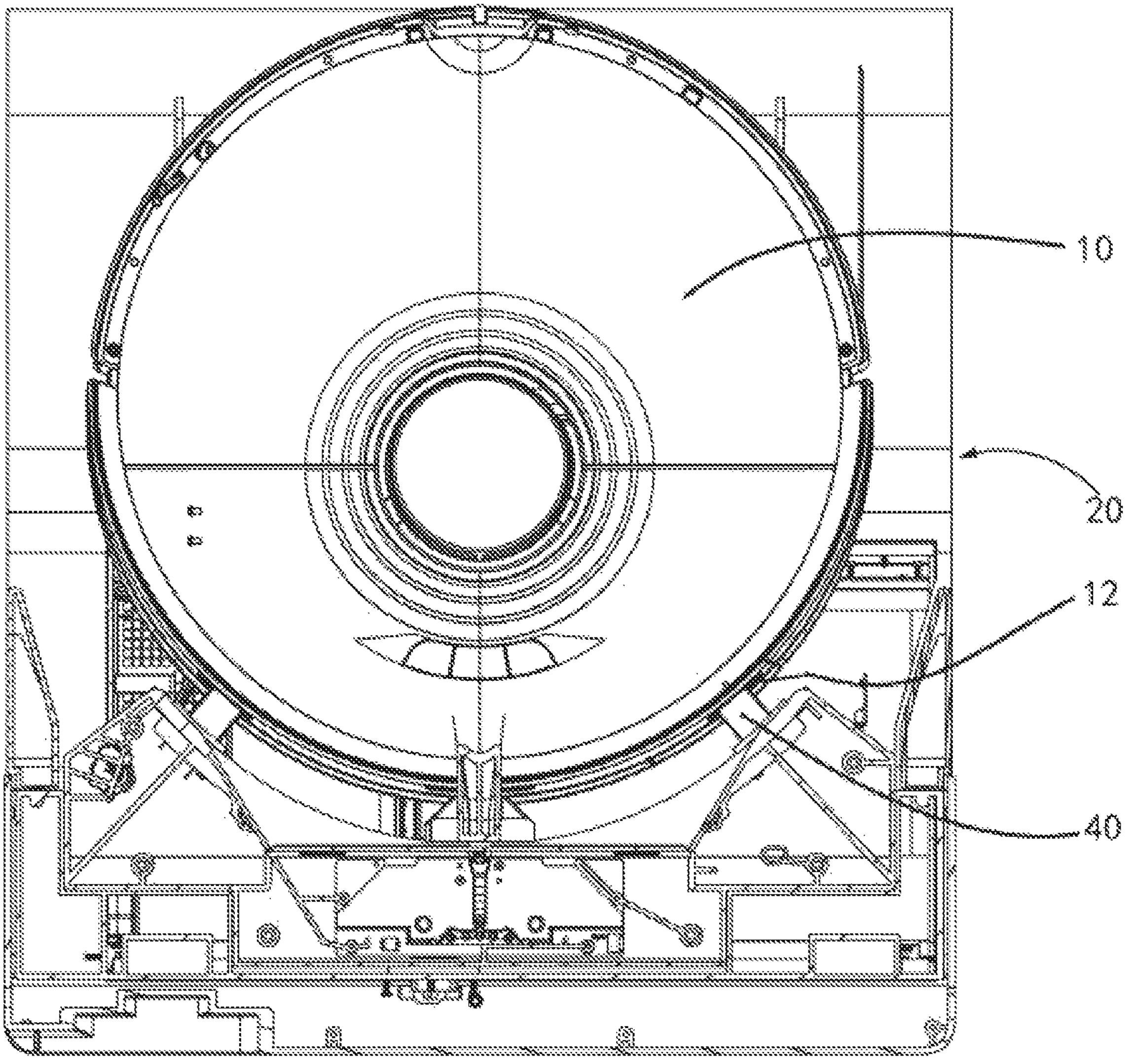
FIG. 2 is a schematic structural diagram illustrating a cleaning robot of a cleaning robot system in a second posture according to an exemplary embodiment.

As shown in FIG. 11, the base station further includes a second charging contactor 40, and the second charging contactor 40 is configured to electrically connect with the first charging contactor 12 of the cleaning robot 10, so that the base station may charge the cleaning robot 10. As shown in FIG. 2, in a case that the cleaning robot 10 stays at the base station, the second charging contactor 40 is electrically connected to the first charging contactor 12.

In some embodiments, as shown in FIG. 12, the base station body 20 further includes a guide side surface 23, the second charging contactor 40 is disposed on the guide side surface 23, and the first charging contactor 12 is disposed on a side surface of the cleaning robot 10. Thus, the second charging contactor 40 may be electrically connected to the first charging contactor 12.

In some embodiments, as shown in FIG. 12, the guide side surface 23 includes two opposite side surfaces 231 and an middle surface 232 located between the two side surfaces 231, wherein the middle surface 232 is opposite to a forward direction of the cleaning robot 10 moving toward the base station. The second charging contactor 40 is disposed on the middle surface 232. That is, the first charging contactor 12 is disposed on an end side surface of the cleaning robot 10.

In an embodiment of the present disclosure, the plurality of second charging contactors 40 and the plurality of first charging contactors 12 are all arranged in pairs. Optionally, the second charging contactors 40 may also be located on the side surface 231. That is, the two second charging contactors 40 in a pair may be located on the two side surfaces 231, respectively.

Figure 21:
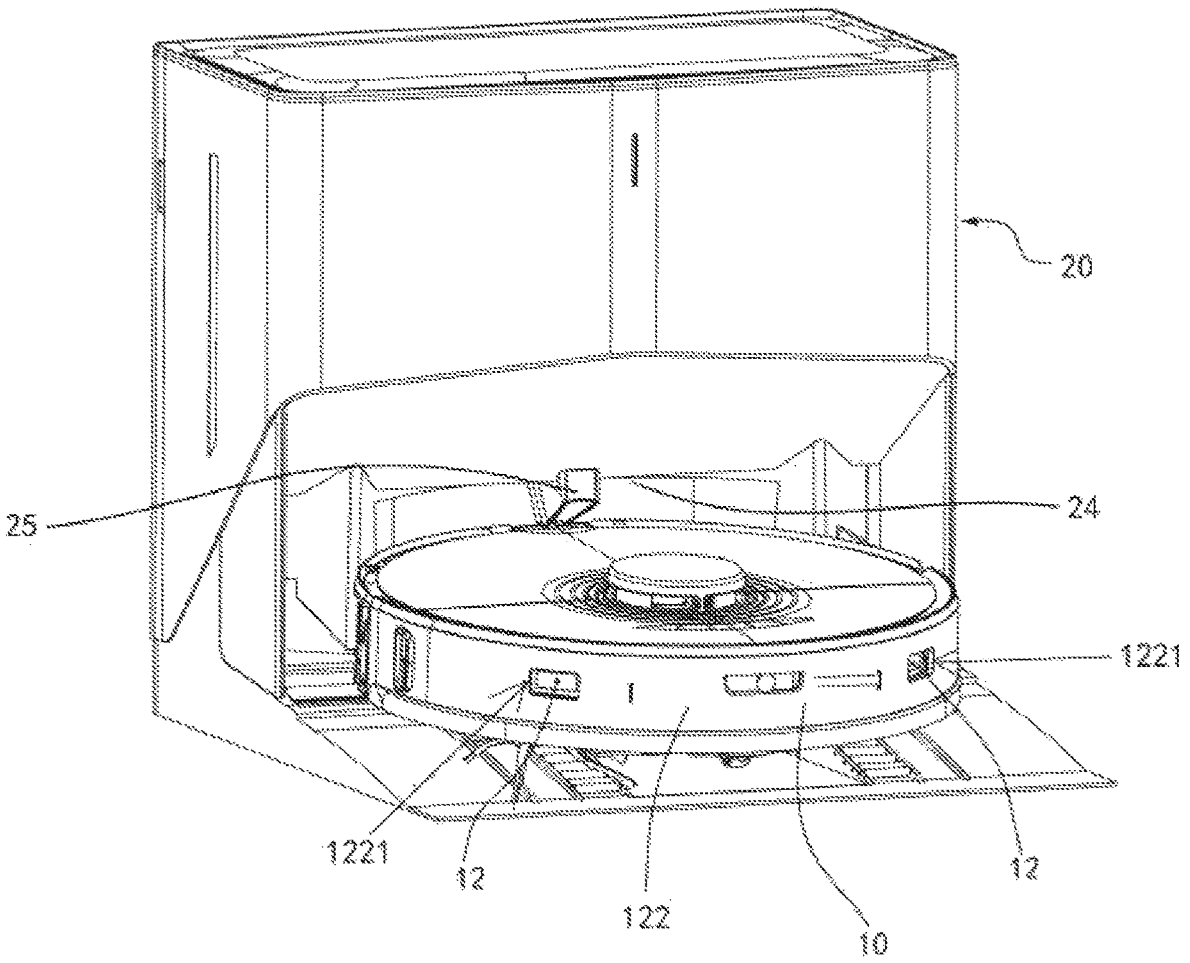
FIG. 21 is a schematic diagram illustrating a cooperative structure between a cleaning robot of a cleaning robot system and a base station according to an exemplary embodiment.

Accordingly, in an embodiment of the present disclosure, the first charging contactor 12 located on the cleaning robot 10 may be located on the front side of the cleaning robot 10. As shown in FIG. 21, the forward portion of the cleaning robot 10 is provided with a bumper 122, which is movably disposed on the robot body of the cleaning robot 10. In a case that the cleaning robot 10 encounters an obstacle in front of it in motion, the bumper 122 will collide with the obstacle and move toward the robot body of the cleaning robot 10. After the cleaning robot 10 is free from the obstacle, the bumper 122 moves away from the robot body of the cleaning robot 10. Therefore, during the operation of the cleaning robot 10, the bumper 122 may be continuously compressed and extended. In an embodiment of the present disclosure, the first charging contactor 12 of the cleaning robot 10 is disposed on the robot body of the cleaning robot 10 behind the bumper 122, and a through hole 1221 is formed in the corresponding part of the bumper 122. Thus, the first charging contactor 12 is in contact with the second charging contactor 40 during the charging process of the cleaning robot 10. Since the first charging contactor 12 is disposed at the rear part of the bumper 122, it may be prevented from being directly exposed to the outside of the robot body, thereby avoiding the friction damage to the first charging contactor 12 if the cleaning robot 10 collides with a hard obstacle.

In an embodiment of the present disclosure, the first charging contactor 12 and the wet cleaning system 400 of the cleaning robot 10 are respectively located on opposite sides of the cleaning robot 10, that is, at the front and rear ends in a travelling direction of the cleaning robot 10. Specifically, the first charging contactor 12 is located on the front side of the cleaning robot 10, and the wet cleaning system 400 is located on the rear side of the cleaning robot 10. Therefore, in an embodiment of the present disclosure, the cleaning robot 10 may stay at the base station in two postures. In a case that the cleaning robot 10 returns to the base station for charging, the cleaning robot 10 is travelling forward to stay at the base station. In a case that the cleaning robot 10 cleans the wet cleaning system 400 or fills the liquid container 13, the cleaning robot 10 is travelling in a reverse direction to stay at the base station. In order to cooperate with these two travelling modes, elements for communicating with the base station may be disposed in the front and rear direction of the cleaning robot 10. For example, an infrared device for receiving signals from the base station, etc., is disposed in the front and rear direction of the cleaning robot 10, which is not limited by the present disclosure.

Figure 19:
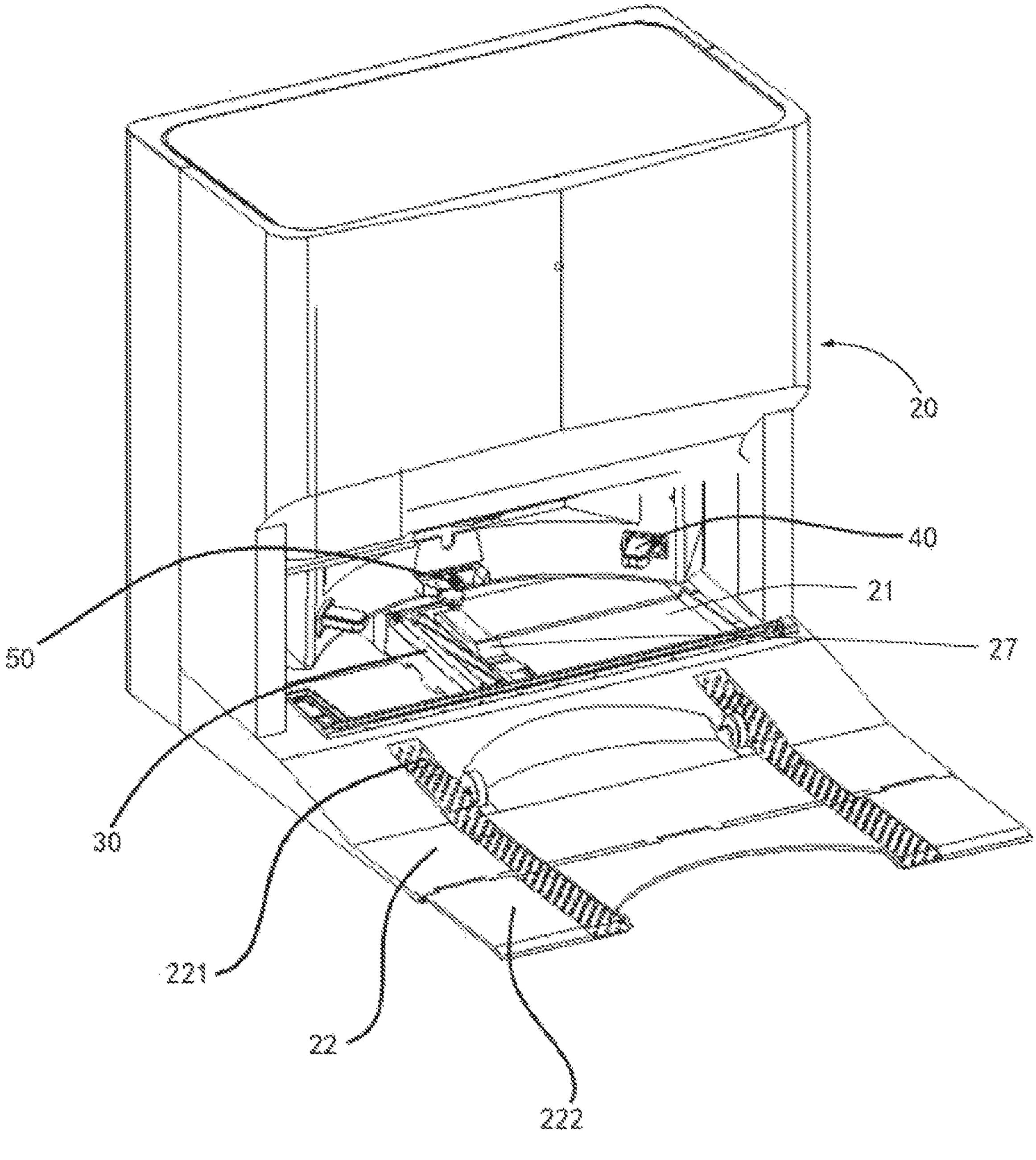
FIG. 19 is a schematic structural diagram illustrating a base station in one state according to another exemplary embodiment.

In an embodiment of the present disclosure, as shown in FIG. 19, the base station may further include a guide bridge 27, disposed above the cleaning groove 21 and configured to support the driven wheel 142 of the cleaning robot 10. As shown in FIG. 4, the driven wheel 142 is disposed in front of the bottom part of the cleaning robot 10. In a case that the cleaning robot 10 stays at the base station for charging, in order to maintain the stability of the cleaning robot 10, a support (that is, the guide bridge 27) may be disposed under the driven wheel 142. As shown in FIG. 19, the guide bridge 27 in an embodiment spans the front and rear ends of the cleaning groove 21, so as to guide the movement of the driven wheel 142 and play a supporting role after the cleaning robot 10 is parked. In other embodiments of the present disclosure, a forwardly extending broken bridge may be disposed only at the front end of the groove, and its extension length may be determined according to factors such as the parking position of the cleaning robot 10 and the disposing position of the driven wheel 142, which is not limited in the present disclosure. In an embodiment of the present disclosure, since the cleaning component 30 capable of reciprocating left and right is disposed above the cleaning groove, the guide bridge 27 may be movably disposed above the cleaning groove 21, so as to prevent the guide bridge 27 from obstructing the movement of the cleaning component 30. For example, in a case that the cleaning robot 10 stays at the base station for charging, the guide bridge 27 may be moved to the middle part of the cleaning groove 21, so as to guide and support the driven wheel 142 of the cleaning robot 10. In a case that the cleaning robot 10 stays at the base station to clean the cleaning head 410 of the wet cleaning system 400, the guide bridge 27 may be moved to one side of the cleaning groove 21, so that the cleaning component 30 may move left and right. In an embodiment of the present disclosure, as shown in FIG. 19, the guide bridge 27 and the cleaning component 30 may be disposed on the same holder, and are driven by the same driving part to move to left and right. This arrangement helps to provide a more compact arrangement for various components, and effectively utilize the space of the base station.

In an embodiment of the present disclosure, as shown in FIG. 19, the base station body 20 further includes a guide plate 22, and the guide plate 22 is provided with a slip-resistance protrusion 221. The cleaning robot 10 moves along the slip-resistance protrusion 221 onto the guide plate 22. The slip-resistance protrusion 221 may generate a certain friction with respect to the cleaning robot 10, ensuring that the cleaning robot 10 can reliably move onto the base station body 20, and can assist the cleaning robot 10 in fixture during the cleaning process.

In an embodiment of the present disclosure, the cleaning component 30 is located above the guide plate 22, and the cleaning component 30 and the slip-resistance protrusion 221 are spaced apart. Thus, after the cleaning robot 10 moves a certain distance on the guide plate 22, the cleaning component 30 is disposed opposite to the cleaning system 150, so as to perform the subsequent cleaning process.

Optionally, the cleaning groove 21 is disposed on the guide plate 22, and the guide plate 22 includes an inclined surface and a flat surface. The slip-resistance protrusion 221 may be disposed on the inclined surface, and the cleaning groove 21 may be disposed on the flat surface.

It should be noted that the slip-resistance structure formed by the slip-resistance protrusions 221 corresponds to the walking wheel assembly of the cleaning robot 10. In a case that there are two traveling wheel assemblies, there are also two slip-resistance structures.

Figure 20:
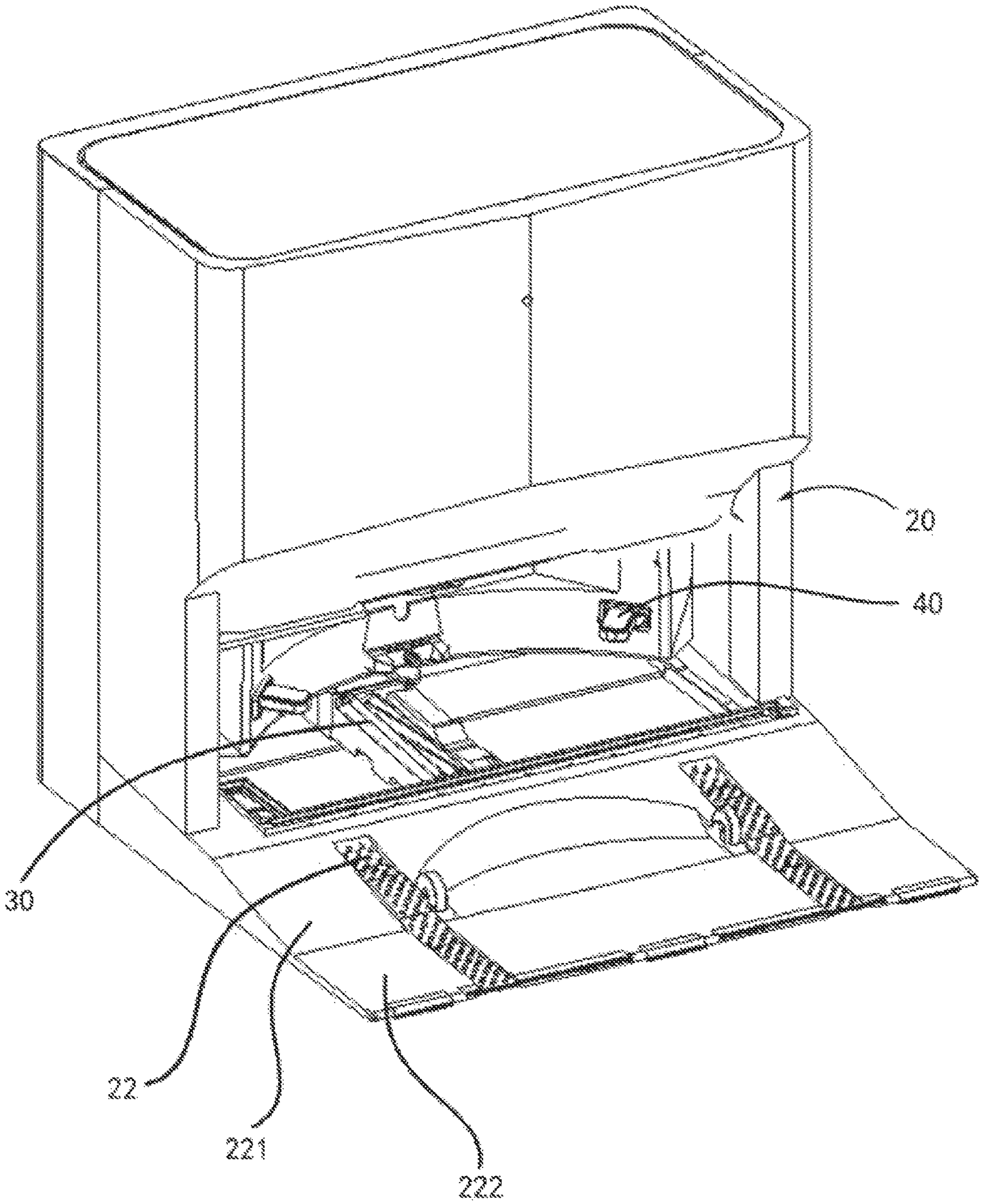
FIG. 20 is a schematic structural diagram illustrating a base station in another state according to another exemplary embodiment.

In an embodiment of the present disclosure, as shown in FIGS. 19 and 20, an extension plate 222 is disposed on the base station body 20, and the extension plate 222 is connected to an end of the base station body 20, thereby assisting the cleaning robot 10 in moving to the base station body 20. The extension plate 222 is foldably disposed. That is, it can be stacked on the guide plate 22. In a special situation, such as in the case where the floor is slippery, the extension plate 222 may be released to facilitate the cleaning robot 10 to climb.

In an embodiment of the present disclosure, the base station body 20 further includes a guide ceiling 24 on which a guide part for contacting the cleaning robot 10 is disposed. The guide part is located above the cleaning component 30. The guide part may limit the cleaning robot 10 in position and ensure that the cleaning robot 10 moves to a suitable position.

Specifically, the guide part is located above the cleaning component 30. That is, the cleaning component 30 is located on the guide plate 22, and the guide part is located on the guide ceiling 24. Along a height direction, the guide part is located above the cleaning component 30.

Figure 22:
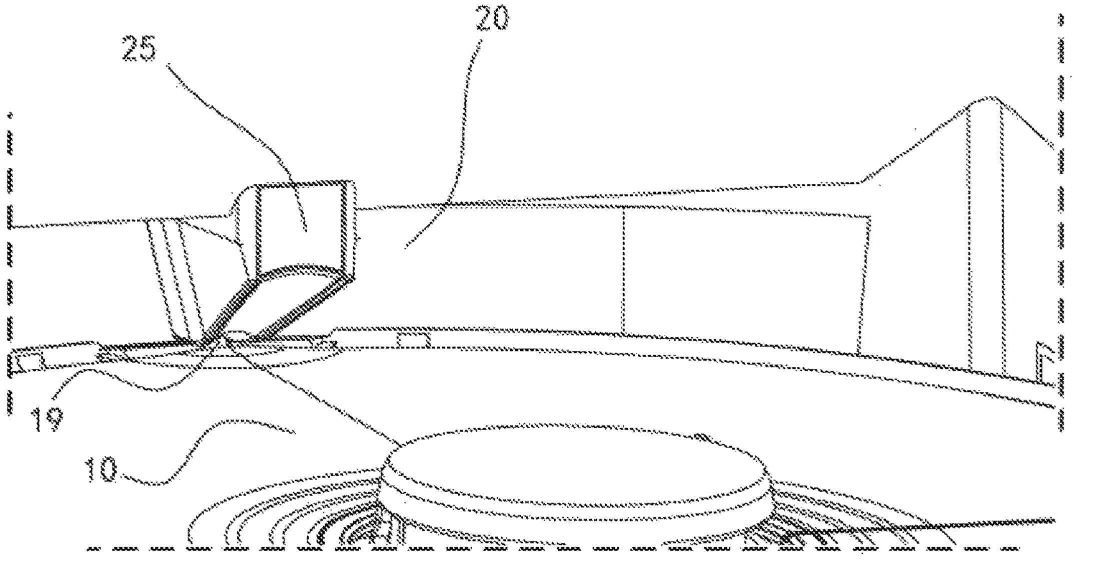
FIG. 22 is a schematic diagram illustrating a partial cooperation structure between a cleaning robot of a cleaning robot system and a base station according to an exemplary embodiment.

In an embodiment of the present disclosure, as shown in FIGS. 21 and 22, the guide part may include a guide block 25, and a rotating wheel 19 is disposed on the upper edge of the cleaning robot 10. As shown in FIG. 9, the rotating wheel 19 may rotate along an axis perpendicular to the motion direction of the cleaning robot 10. In a case that the cleaning robot 10 needs to move to the base station body 20, the rotating wheel 19 may cooperate with the guide block 25, which facilitates the cleaning robot 10 to move to the base station body 20 more smoothly.

Figure 23:
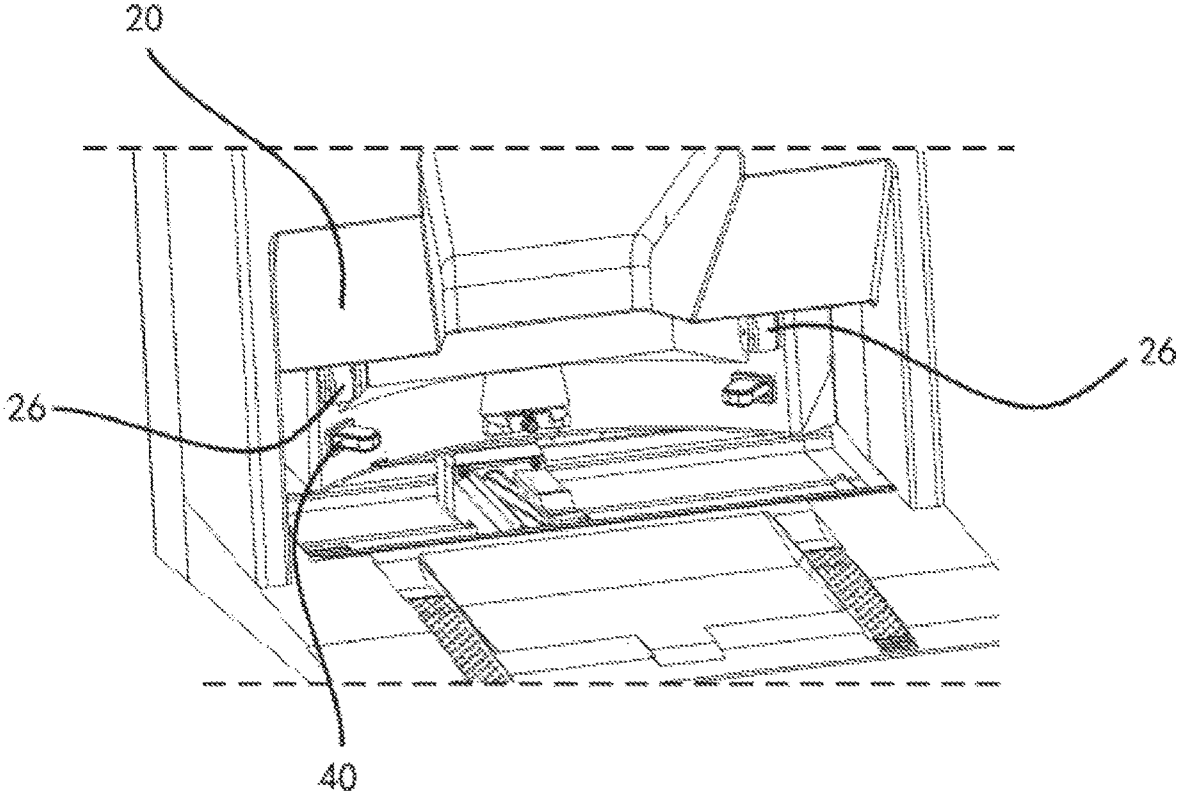
FIG. 23 is a schematic partial structural diagram illustrating a base station according to an exemplary embodiment.

In an embodiment of the present disclosure, as shown in FIG. 23, the guide part may include a guide wheel 26. In addition to assisting the cleaning robot 10 in moving to the base station body 20, the guide wheel 26 restricts the motion of the cleaning robot 10 in a vertical direction once the cleaning robot 10 stays at the base station body 20. For example, in a case that the cleaning robot 10 stays at the base station body 20 for cleaning, the cleaning component 30 of the base station contacts the cleaning head 410 of the wet cleaning system 400 of the cleaning robot 10, and applies a vertical upward thrust onto the cleaning robot 10. The arrangement of the guide wheel 26 may partially or completely offset the vertical upward thrust, thereby preventing the cleaning robot 10 from moving upwards. Optionally, there may be at least two guide wheels 26, and they are symmetrically distributed on the left and right sides of the base station.

The base station in an embodiment can realize the cleaning of the cleaning robot, the liquid filling of the liquid container of the cleaning robot, and the charging of the cleaning robot.

Other embodiments of the present disclosure will be apparent to those skilled in the art from consideration of the specification and practice of the contents disclosed herein. The present application is intended to cover any variations, uses, or adaptations of the present disclosure, which are in accordance with the general principle of the present disclosure and include common general knowledge or conventional technical means in the art that are not disclosed in the present disclosure. The specification and embodiments are illustrative, and the real scope and spirit of the present disclosure is defined by the appended claims.

It should be understood that the present disclosure is not limited to the precise structures that have been described above and shown in the drawings, and various modifications and changes can be made without departing from the scope thereof. The scope of the present disclosure is limited only by the appended claims.

What is claimed is:

1. A base station for cleaning a cleaning system of a cleaning robot, comprising:

a base station body, comprising a cleaning groove;

a cleaning component, movably disposed on the base station body, and comprising a liquid outlet device, wherein cleaning liquid discharged by the liquid outlet device is configured to clean the cleaning system and enter the cleaning groove; and a driving part, connected with the base station body and configured to drive the cleaning component to move relative to the cleaning robot, wherein the cleaning component further comprises a cleaning part, and the cleaning part comprises a first cleaning part and a second cleaning part;

the first cleaning part and the second cleaning part are disposed to be movable synchronously in a same direction;

the first cleaning part comprises a cleaning roller configured to be rotatable while moving horizontally, thereby bringing debris out from a cleaning head of the cleaning system; and the second cleaning part comprises a cleaning scraper configured to scrape the debris and waste liquid on the cleaning head.

2. The base station according to claim 1, wherein the cleaning component further comprises:

a cleaning component holder, on which the liquid outlet device is disposed.

3. The base station according to claim 2, wherein the driving part is further connected with the cleaning component holder and configured to drive the cleaning component holder to move relative to the base station body.

4. The base station according to claim 2, wherein the base station further comprises:

a liquid delivery channel, wherein one end of the liquid delivery channel is in communication with a liquid supply part, and the other end of the liquid delivery channel is in communication with the liquid outlet device, so that the liquid supply part supplies the cleaning liquid into the liquid outlet device via the liquid delivery channel; and wherein, at least a part of the liquid delivery channel is movably disposed along with the cleaning component holder.

5. The base station according to claim 2, wherein the cleaning part is disposed on the cleaning component holder parallel to the liquid outlet device.

6. The base station according to claim 1, wherein a plurality of liquid outlets are disposed on the liquid outlet device at intervals.

7. The base station according to claim 1, wherein a liquid outlet is disposed on the liquid outlet device, wherein the liquid outlet is disposed to face at least one of the first cleaning part and the second cleaning part, and the cleaning liquid discharged from the liquid outlet is sprayed to at least one of the first cleaning part and the second cleaning part.

8. The base station according to claim 1, wherein a liquid outlet is disposed on the liquid outlet device, the liquid outlet is disposed to face the cleaning system, and the cleaning liquid discharged from the liquid outlet is sprayed to the cleaning system.

9. The base station according to claim 1, further including a liquid delivery channel, wherein one end of the liquid delivery channel is in communication with a liquid supply part, and the other end of the liquid delivery channel is in communication with the liquid outlet device, the liquid delivery channel is provided with a pump, and the cleaning liquid within the liquid supply part is delivered to the liquid outlet device under the action of the pump.

10. A cleaning robot system, comprising:

a base station for cleaning a cleaning system of a cleaning robot; and a cleaning robot, wherein the base station comprises:

a base station body, comprising a cleaning groove;

a cleaning component, movably disposed on the base station body, and comprising a liquid outlet device, wherein cleaning liquid discharged by the liquid outlet device is configured to clean the cleaning system and enter the cleaning groove; and a driving part, connected with the base station body and configured to drive the cleaning component to move relative to the cleaning robot, wherein the cleaning component further comprises a cleaning part, and the cleaning part comprises a first cleaning part and a second cleaning part;

the first cleaning part and the second cleaning part are disposed to be movable synchronously in a same direction;

the first cleaning part comprises a cleaning roller configured to be rotatable while moving horizontally, thereby bringing debris out from a cleaning head of the cleaning system; and the second cleaning part comprises a cleaning scraper configured to scrape the debris and waste liquid on the cleaning head.

11. A base station for cleaning a cleaning system of a cleaning robot, comprising:

a base station body, comprising a cleaning groove;

a cleaning component, disposed on the base station body approximately horizontally, and comprising a liquid outlet device and a cleaning part; and a driving part, connected with the base station body and configured to drive the cleaning component to move relative to the cleaning robot, wherein, cleaning liquid discharged by the liquid outlet device is configured to clean the cleaning system by the cleaning part and enter the cleaning groove, wherein the cleaning component further comprises a cleaning part, and the cleaning part comprises a first cleaning part and a second cleaning part;

the first cleaning part and the second cleaning part are disposed to be movable synchronously in a same direction;

the first cleaning part comprises a cleaning roller configured to be rotatable while moving horizontally, thereby bringing debris out from a cleaning head of the cleaning system; and the second cleaning part comprises a cleaning scraper configured to scrape the debris and waste liquid on the cleaning head.

12. The base station according to claim 11, wherein the cleaning component is movably disposed on the base station body.

13. The base station according to claim 11, wherein the cleaning component further comprises:

a cleaning component holder, on which the liquid outlet device and the cleaning part are disposed, wherein the liquid outlet device is parallel to the cleaning part.

14. The base station according to claim 13, wherein the driving part is further connected with the cleaning component holder and configured to drive the cleaning component holder to move relative to the base station body.

15. The base station according to claim 11, wherein a plurality of liquid outlets is disposed on the liquid outlet device at intervals.

16. The base station according to claim 11, further comprising:

a first pump, configured to pump the cleaning liquid into the cleaning groove; and a second pump, configured to pump out the cleaning liquid from the cleaning groove.

17. The base station according to claim 11, further comprising:

a liquid filling connector, disposed on the base station body, and configured to connect with a liquid filling port of a liquid container of the cleaning robot, to fill liquid into the liquid container of the cleaning robot.

* * * * *